US012693943B2

(12) United States Patent
Dhavale et al.

(10) Patent No.: US 12,693,943 B2
(45) **Date of Patent: \*Jul. 28, 2026**

(54) GRANULAR CLOUD RESTORE WITH MULTI STORAGE CLASS SUPPORT

(71) Applicant: NetApp, Inc., San Jose, CA (US)

(72) Inventors: Sanhita Praveen Dhavale, San Jose, CA (US); Tijin George, San Jose, CA (US); Avanthi Rajan, Fremont, CA (US); Harsha Vardhan Reddy Perannagari, San Jose, CA (US); Sumedh Guha, San Jose, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/204,676

(22) Filed: May 12, 2025

(65) Prior Publication Data

US 2025/0335316 A1 Oct. 30, 2025

Related U.S. Application Data

(63) Continuation of application No. 18/423,365, filed on Jan. 26, 2024, now Pat. No. 12,298,867.

(60) Provisional application No. 63/505,137, filed on May 31, 2023.

(51) Int. Cl.
*G06F 11/1446* (2026.01)

(52) U.S. Cl.
CPC ...... *G06F 11/1469* (2013.01); *G06F 11/1464* (2013.01); *G06F 2201/84* (2013.01)

(58) Field of Classification Search
None
See application file for complete search history.

(56) References Cited

U.S. PATENT DOCUMENTS

| | | |
|---|---|---|
| 10,360,099 B2 | 7/2019 | Subramanian et al. |
| 10,521,143 B2 | 12/2019 | Subramanian et al. |
| 11,036,420 B2 | 6/2021 | Thoppil et al. |
| 11,048,430 B2 | 6/2021 | Thoppil et al. |
| 11,132,339 B2 | 9/2021 | Kaushik et al. |
| 11,151,162 B2 | 10/2021 | Narasingarayanapeta |
| 11,210,013 B2 | 12/2021 | Thoppil et al. |
| 11,615,001 B2 | 3/2023 | Naidu et al. |

(Continued)

OTHER PUBLICATIONS

"FabricPool Tier Management", NetApp, URL: https://docs.netapp. com/us-en/ontap/pdfs/sidebar/FabricPool_tier_management.pdf, Apr. 16, 2024, 58 pages.

(Continued)

*Primary Examiner* — Eddy Cheung
(74) *Attorney, Agent, or Firm* — Cooper Legal Group, LLC

(57) ABSTRACT

Techniques are provided for performing a storage operation targeting objects stored across multiple storage tiers of a cloud storage environment. A volume may be backed up as objects stored across the multiple storage tiers of the cloud storage environment, such as a standard storage tier directly accessible to the storage operation, an archival storage tier not directly accessible to the storage operation, etc. The storage operation may target the objects, such as where the storage operation is a directory restore operation to restore a directory of the volume. The storage operation can be successfully implemented such as to restore the directory even though objects of the storage operation are stored across the multiple storage tiers of the cloud storage environment.

20 Claims, 18 Drawing Sheets

(56)       References Cited

U.S. PATENT DOCUMENTS

| | | |
|---|---|---|
| 11,650,886 B2 | 5/2023 | Mathew et al. |
| 11,853,104 B2 | 12/2023 | Naidu et al. |
| 12,298,867 B2 | 5/2025 | Dhavale et al. |
| 2022/0245034 A1 | 8/2022 | Nara et al. |
| 2023/0029616 A1 | 2/2023 | Pandit et al. |
| 2023/0385153 A1 | 11/2023 | George et al. |

OTHER PUBLICATIONS

"HA Pair Management", NetApp, URL: https://docs.netapp.com/us-en/ontap/pdfs/sidebar/HA_pair_management.pdf, Apr. 16, 2024, 26 pages.

Notice of Allowance mailed on Jan. 16, 2025 for U.S. Appl. No. 18/423,365, filed Jan. 26, 2024, 10 pages.

"SVM Data Mobility", NetApp, URL: https://docs.netapp.com/us-en/ontap/pdfs/sidebar/SVM_data_mobility.pdf, Apr. 16, 2024, 14 pages.

200

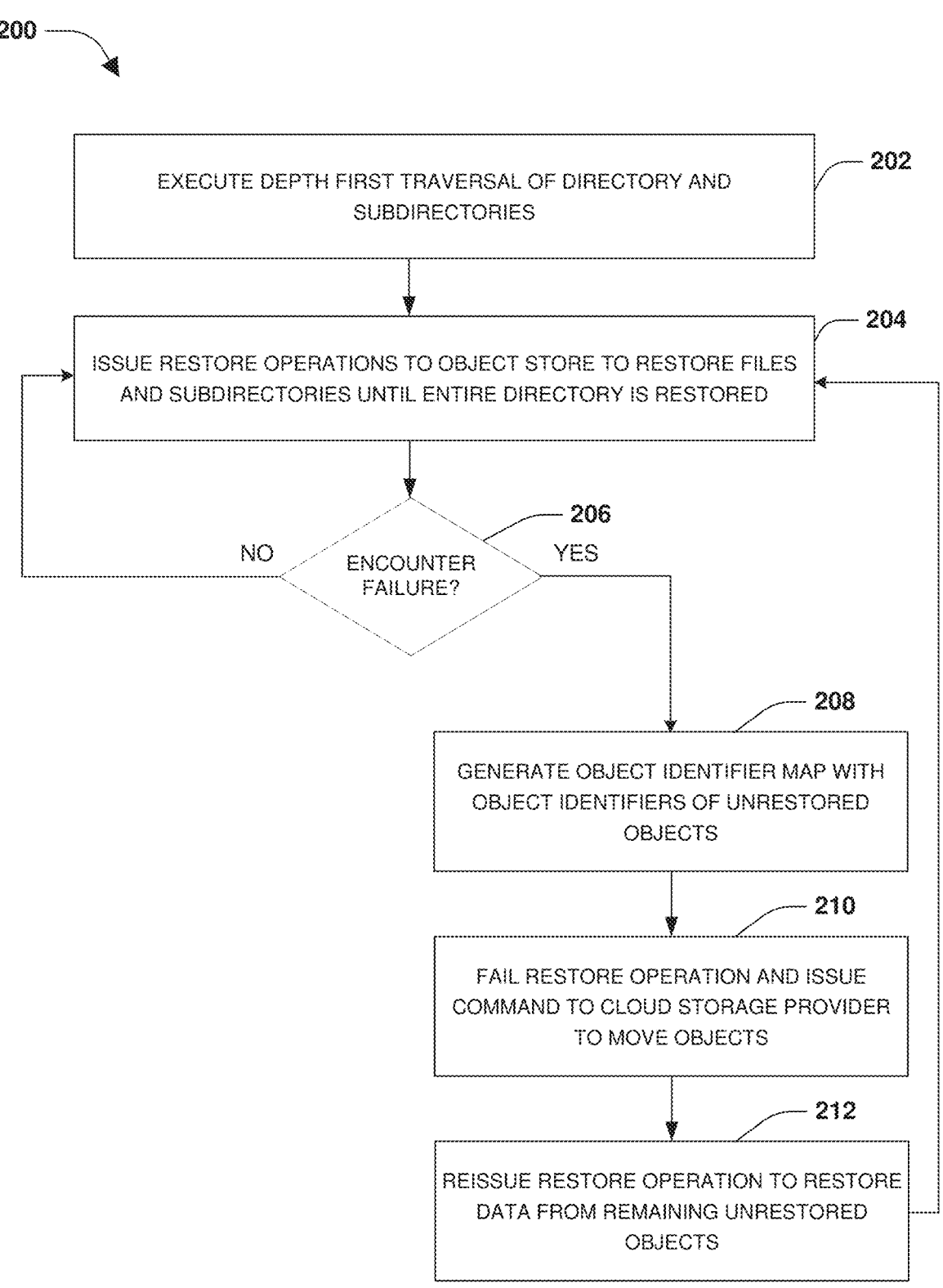

EXECUTE DEPTH FIRST TRAVERSAL OF DIRECTORY AND SUBDIRECTORIES — 202

ISSUE RESTORE OPERATIONS TO OBJECT STORE TO RESTORE FILES AND SUBDIRECTORIES UNTIL ENTIRE DIRECTORY IS RESTORED — 204

— 206
NO          ENCOUNTER FAILURE?          YES

GENERATE OBJECT IDENTIFIER MAP WITH OBJECT IDENTIFIERS OF UNRESTORED OBJECTS — 208

FAIL RESTORE OPERATION AND ISSUE COMMAND TO CLOUD STORAGE PROVIDER TO MOVE OBJECTS — 210

REISSUE RESTORE OPERATION TO RESTORE DATA FROM REMAINING UNRESTORED OBJECTS — 212

402  Level 0

404  Level 1

1. Push D1 onto the checkpoint stack
2. Restore streams and ACLs to D1
3. Iterate through D1
4. Exit once subdirectory is found (S1)
5. Restore files F0 – F2
6. Push S1 to checkpoint stack
7. Create subdirectory S1
8. Restore ACLs and Streams to S1

420  Checkpoint Stack

| S1 |
|----|
| D1 |

400

402 — Level 0

404 — Level 1

406 — Level 2

420 — Checkpoint Stack

| S2 |
| S1 |
| D1 |

1. Iterate through S1
2. Create and fence base file F3
3. Restore F3
4. Push S2 to checkpoint stack
5. Create sub directory S2
6. Restore ACLs and Streams 1. Iterate through S2
2. Push S3 to checkpoint stack
3. Create sub directory S3
4. Restore ACLs and streams
5. Iterate S3
6. Create base file F4
7. Restore F4

1. Iterate over S1
2. EOF Received for S1
3. Pop S1 from checkpoint stack
4. Iterate over D1
5. Create and fence base files F6, F7
6. Restore F6 and F7
7. Push S4 onto checkpoint stack
8. Create sub directory S4
9. Restore ACLs and streams to S4

800

802

804 — COMPUTER INSTRUCTIONS

806 — 01011010001010
10101011010101
101101011100...

808 — COMPUTER READABLE MEDIUM

GRANULAR CLOUD RESTORE WITH MULTI STORAGE CLASS SUPPORT

RELATED APPLICATIONS

This application claims priority and is a continuation of U.S. Patent Application, titled "GRANULAR CLOUD RESTORE WITH MULTI STORAGE CLASS SUPPORT", filed on Jan. 26, 2024 and accorded application Ser. No. 18/423,365, which claims priority to U.S. Provisional Patent Application, titled "GRANULAR CLOUD RESTORE WITH MULTI STORAGE CLASS SUPPORT", filed on May 31, 2023 and accorded Application No. 63/505,137, which are incorporated herein by reference.

BACKGROUND

Many storage systems store data within cloud storage environments. For example, a storage system may host a volume to store data. A snapshot service of the storage system may create snapshots (i.e., point-in-time copies) of the volume. Snapshot data of the snapshots may be stored within objects that are backed up into a cloud storage environment. The storage system may implement a tiering service that stores data within different storage tiers, such as a local storage tier (e.g., an on-premise storage tier or a performance storage tier), a standard cloud storage tier, an archival cloud storage tier, etc. The storage system may provide other services such as a restore service that allows a computing system (also referred to as a client system or client) to perform a full volume restore or a single file restore operation to restore the volume or a file within the volume using snapshot data backed up into objects within the cloud storage environment.

DESCRIPTION OF THE DRAWINGS

FIG. 2 is a flow chart illustrating an example method for performing a storage operation targeting objects stored across multiple storage tiers in accordance with an embodiment of the present technology.

DETAILED DESCRIPTION

Figure 1:
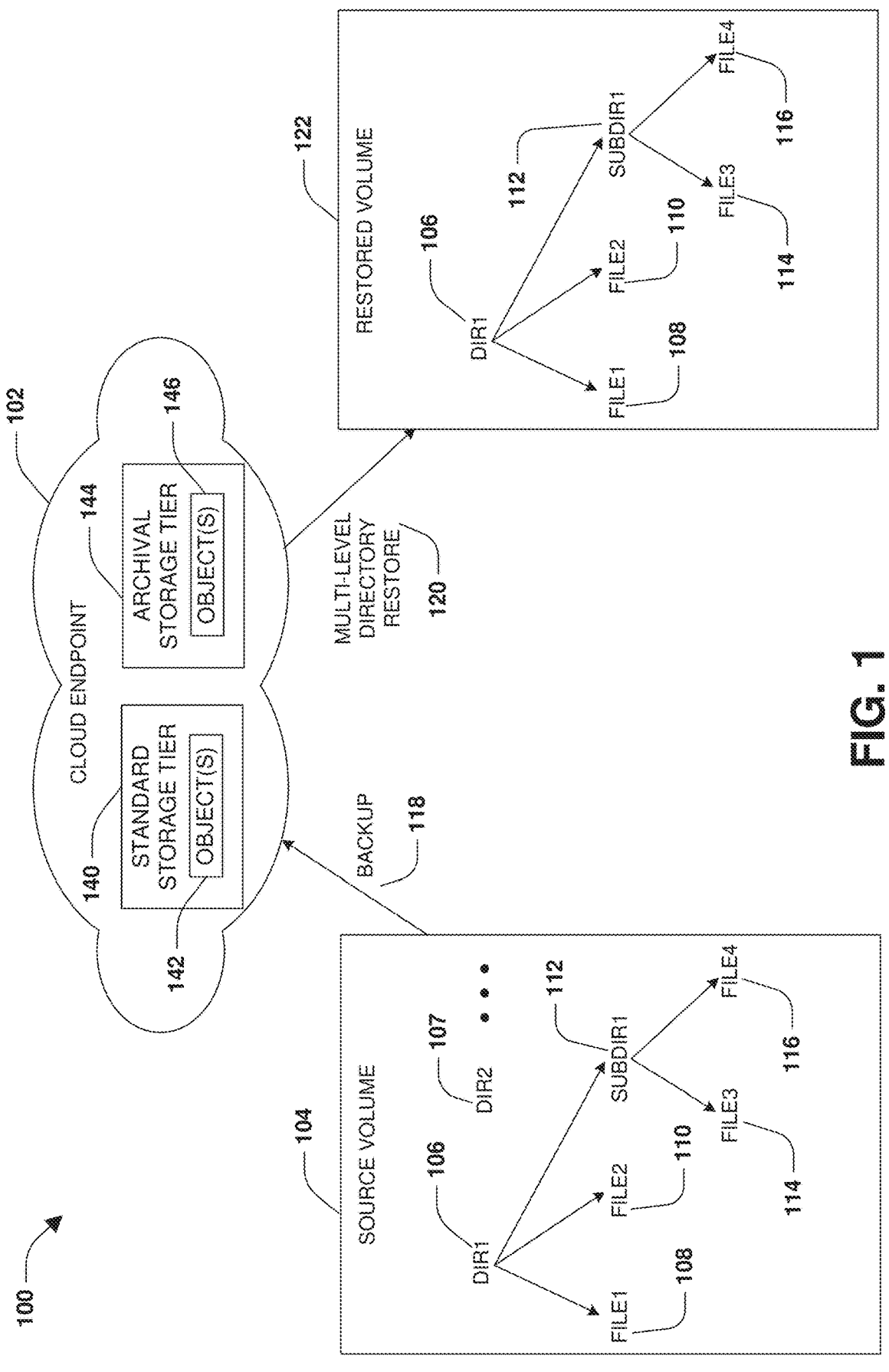
FIG. 1 is a block diagram illustrating an example of performing a multi-level directory restore operation targeting objects stored across multiple storage tiers in accordance with an embodiment of the present technology.

Some examples of the claimed subject matter are now described with reference to the drawings, where like reference numerals are generally used to refer to like elements throughout. In the following description, for purposes of explanation, numerous specific details are set forth to provide an understanding of the claimed subject matter. It may be evident, however, that the claimed subject matter may be practiced without these specific details. Nothing in this detailed description is admitted as prior art.

A storage system may back up a volume to an object store of a cloud storage environment, such as by creating snapshots of the volume and storing snapshot data in objects within the object store. Conventional restore operations may allow a user to restore a single file using a single file restore operation, an entire volume using a full volume restore operation that destroys any existing volume data, or a single level directory restore that can only restore files within a directory but cannot restore subdirectories and contents of the subdirectories. Additionally, such conventional restore operations fail if objects are stored across different storage tiers of the cloud storage environment such as where frequently accessed objects are stored within a standard storage tier (e.g., an S3 storage) accessible to a restore operation and where infrequently accessed objects are stored within an archival storage tier may not be directly accessible to the restore operation.

Accordingly, a data format is provided herein for efficient management and checkpoint support for implementing a storage operation, along with techniques for implementing storage operations that target objects stored across different storage tiers of a cloud storage environment.

Many users desire the ability to restore their data at a granularity somewhere between a full volume restore and a single file restore. For example, assume a company's department has 100 employees and each has data stored using a volume. If an employee loses their data such as data within a home directory, then it is not practical for an administrator to individually restore every file in that employee's home directory. Also, to restore all 100 employee's home directories just for that 1 employee's home directory will be wasteful and time consuming. Accordingly, the techniques disclosed herein provide the ability to selectively copy/ restore part of a volume (e.g., restore a directory along with all subdirectories and files within a directory hierarchical structure of the directory) or a full volume restore (e.g., restore a root directory of a volume) without destroying/ losing existing volume data.

It may be appreciated that the techniques provided herein are not limited to directory level restore operations but can relate to any other type of storage operation that targets objects within an object store.

In one aspect, a directory restore operation can restore directories of any depth (e.g., any number of nested directories) or breadth. This is achieved by using base and instance metafiles. These metafiles can be used for other types of storage operations beyond directory level restore operations.

The directory restore operation works with objects in any storage tier (e.g., standard S3 storage directly accessible to the directory restore operation, archival storage not directly accessible to the directory restore operation, and/or any other type of storage hosted by a cloud storage provider or any other storage provider). The directory restore operation can restore a directory whose data is stored in objects hosted across multiple different storage tiers such as where some objects are stored within the standard S3 storage and other objects are stored within the archival storage. On-demand restore functionality is provided such that clients can access the data being restored before completing the entire directory restore operation. If a client requests already restored data, then the already restored data is provided to the client. If the client requests not yet restored data, then the not yet restored data is on-demand restored and the client is provided with access to the on-demand restore data.

In some embodiments of implementing a data format for efficient management and checkpoint support for a storage operation, the storage operation can operate on multiple levels of a hierarchical data structure (a directory hierarchical structure) such as subdirectories of a directory. Additionally, checkpoints are tracked using base and instance metafiles so that if the storage operation is aborted, then the storage operation can be restarted/resumed from a subdirectory that was last being restored without having to start from the beginning and without restoring already restored files and subdirectories. Additionally, the metafiles are extendable and are not limited to a fixed size, and thus the storage operation is not limited to a particular depth or breadth of the hierarchical data structure.

As an example, a directory restore operation performs a depth first traversal of a directory D0 being restored using one or more snapshots whose snapshot data has been backed up in objects within the object store across one or more storage tiers of a cloud storage environment. When a subdirectory (a parent subdirectory) is encountered, the files and subdirectories within that subdirectory (the parent subdirectory) are restored before proceeding to a next file or subdirectory (a child subdirectory) in that subdirectory (the parent subdirectory). For example, the traversal encounters file F0 within the directory D0 and restores file F0. The traversal next encounters file F1 within the directory D0 and restores file F1. The traversal next encounters subdirectory S0 within the directory D0 and restores the entire depth of subdirectory S0 before moving on to file F2 within the directory D0. The metafiles associated with the directory restore operation are used to track progress of the traversal and what files/subdirectories are restored so if there is a failure while processing subdirectory S0, for example, then the metafiles can be used to restart at subdirectory S0 without having to re-restore files F0 and F1. In this way, the depth of the traversal and what files/subdirectories are restored is tracked by the metafiles, and thus the metafiles are used to track different levels of a directory hierarchal structure that have or are being traversed and restored. For a particular level, a last file identifier that was restored last is tracked and can be identified as checkpoint entry C0. Within a next level down, a last file identifier that was restored last is tracked and can be identified as checkpoint entry C1. The tracking continues until a last level (bottom level) is encountered such as a checkpoint entry C2. Once the last level is restored, then information about the last level is removed from the metafile, and the process traverses back to the directory hierarchal structure removing information as levels are completed. This enables restoring subdirectories of the directory, along with checkpoint and restarting an aborted storage operation from where the storage operation previously left off.

The metafiles are used to store directory information and track how far down each level/branch the storage operation has traversed so the storage operation can be tracked and/or restarted from a checkpoint. As an example, there is a base metafile, and there can be multiple instance metafiles. An instance metafile may comprise a particular data structure (e.g., a stack, a queue, a list, etc.), which may be user defined/selected. The instance metafile can dynamically grow with new entries, and thus the storage operation is not limited to operating on a hierarchical structure (e.g., a directory hierarchal structure) of a particular size, depth, or breadth. When a particular level of a directory has been restored (e.g., level 0 for the directory, level 1 for subdirectories within that directory, level 2 for subdirectories within those subdirectories, etc.), information used to track progress of restoring a level of the directory is removed from the instance metafile.

For each storage operation (e.g., a restore operation), a new base entry is created within the base metafile. The new entry is tied to a new instance metafile that is also created at the start of the storage operation. Within the base metafile, common data applicable to all sub operations of the storage operation is stored (e.g., restore flags, inode mappings to map cloud storage inodes to local volume related inodes and others) within the base entries, which may be fixed sized entries. Instance metafiles are dynamic and can grow in terms of the number of instance entries. Each instance entry corresponds to a sub operation of the storage operation. With a directory restore, a new instance entry is created when a particular subdirectory is being restored to capture progress of restoring that particular subdirectory, and the instance entry is updated whenever a batch of files in that subdirectory have been restored. To access a particular checkpoint, a checkpoint file identifier that is associated with the base metafile, the instance metafile, and the restore transfer operation (e.g., the storage operation or a sub operation) are used to query/key into the base metafile to locate the corresponding instance metafile that can be used to restart the storage operation from a checkpoint captured by the corresponding instance metafile.

In some embodiments, granular cloud restore with multi storage tier support is provided. Snapshot data of snapshots of a volume may be backed up into objects within an object store. The objects may be stored within different storage tiers (e.g., different types or tiers of storage hosted by a cloud storage provider), such as a standard storage tier accessible to a storage operation, an archival tier not directly accessible to the storage operation (e.g., objects must be restored from the archival tier to the standard storage tier before the storage operation can access the objects), etc. Conventional techniques typically move an entire snapshot of a volume (e.g., all objects storing snapshot data of the entire snapshot) between storage tiers to perform the storage operation even if the storage operation is merely restoring a subset of the snapshot such as a particular directory of the volume and not the entire volume. The disclosed technique selectively moves around objects that are being accessed by the storage operation such as the objects storing snapshot data capturing the directory being restored, along with subdirectories of that directory. This reduces operational costs and optimizes execution of the storage operation.

In some embodiments, a directory is to be restored by a storage operation. Snapshot data of the directory may be stored within objects that are stored across different storage tiers. A depth first traversal of the directory is performed. If during the traversal an object storing data of a file/directory being restored is stored within the standard storage tier (or other type of storage tier) accessible to the storage operation, then the data of the object is restored. If another object storing other data of the file/directory is within an archival storage tier (or other type of storage tier) not directly accessible to the storage operation, then a rehydration mechanism is triggered to cause the object store to move the objects from the archival storage tier to the standard storage tier. Once all the data is moved into the standard storage tier, then a new restore operation is issued to complete the overall storage operation.

In an example, a directory includes 100 files. A directory restore operation is initiated. As the directory restore operation encounters files and subdirectories whose objects are stored within the standard storage tier, the data of those objects is restored back to the files and subdirectories. When an object for the directory restore operation is located in the archival storage tier, the object store will return a failure that the object cannot be found in the standard storage tier. This triggers the rehydration mechanism where information about files and subdirectories not yet restored is collected within a list as a separate metafile (a map of object identifiers of objects not located within the standard storage tier) during the directory traversal for the directory restore operation. At the end of the traversal, the metafile with the list of objects that could be stored within the archival storage tier or other storage is obtained and used to instruct the object store to move such objects into the standard storage tier.

In some embodiments, the storage operation switches from a restore mode to an archival mode where file identifiers from an object that resulted in a failure are collected in a metafile until the end of the directory restore operation. In some embodiments, the metafile may be implemented as an object map to track the pending/not yet restore files and directories (track object identifiers of objects comprising data of these files and directories) whose objects could be stored in the archival storage. Once the traversal is finished, the object map is used to issue rehydration requests on the objects in the object map to move the objects into the standard storage tier if the objects have been archived. The current directory restore operation is failed because the granularity is at an object level and is restarted to finish restoring the directory by restoring the objects after being moved to the standard storage tier. The technology disclosed herein supports the restore of files whose data may be stored within objects mixed across different storage tiers. A determination is made as to an amount of time that it will take to finish the rehydration, and this amount of time is waited before the directory restore operation is reissued. The reissued directory restore operation will not re-restore the already restored data, which makes the operation efficient. Instead, the reissued directory restore operation starts where the directory restore operation left off.

This innovation is cost optimized and reduces costs that would be incurred when retrieving data directly from the archival storage. Duplicate charges may also otherwise occur if a duplicate request is sent for the objects in the archival storage while the rehydration is in progress. Instead, this innovation moves the objects to the standard storage tier before accessing the objects. This is because the restore process accesses small object ranges, which could become very expensive if the objects are accessed (e.g., multiple times for each small range of an object) while resident in the archival storage.

Other challenges relate to how the directory traversal is a logical traversal of a directory and not an entire volume, so an existing full volume object identifier map cannot be looped through to identify which objects store content of the directory being restored because this granularity of information is unavailable. This innovation solves this challenge by collecting pointers that represent a directory being restored at any given time. The pointers are used to identify the objects containing data pointed to by the pointers, which is collected as a sub-list of the full volume object identifier map. The sub-list is used to start the rehydration mechanism. This optimizes the directory restore operation that can restore a directory whose files and subdirectories may be stored within objects across different storage tiers.

FIG. 1 is a block diagram illustrating an example of a system 100 for performing a multi-level directory restore operation 120 targeting objects stored across multiple storage tiers, according to one aspect of the present disclosure. A source volume 104 stores directories and files according to a hierarchical structure (e.g., a directory hierarchical structure). The source volume 104 includes a first directory 106 and a second directory 107. Within the first directory 106 is a first file 108, a second file 110, and a first subdirectory 112. Within the first subdirectory 112 is a third file 114 and a fourth file 116. The source volume 104 may include other directories, subdirectories, and/or files. The source volume 104 may be hosted on-premise (e.g., hosted by a node or server connected to a network that provides clients access to the source volume 104) or within a cloud storage environment. The source volume 104 is backed up 118 to a cloud endpoint 102 such as a storage bucket of a cloud storage environment. In some embodiments, a snapshot of the source volume 104 is created as a backup of the source volume 104. Snapshot data of the snapshots is stored within objects that are backed up to the cloud endpoint 102. Some of the objects 142 (e.g., more frequently accessed objects) may be stored within a standard storage tier 140 that is directly accessible to storage operations such as the multi-level directory restore operation 120. Some of the objects 146 (e.g., less frequently accessed objects) may be stored within an archival storage tier 144 that is not directly accessible to storage operations such as the multi-level directory restore operation 120.

The innovative techniques disclosed herein enable the multi-level directory restore operation 120 targeting objects stored across multiple storage tiers of the cloud endpoint 102 (e.g., the standard storage tier 140, the archival storage tier 144, etc.). For example, a client or any other system may request restoration of the first directory 106. Accordingly, the multi-level directory restore operation 120 creates a restored volume 122 within which the first directory 106 is restored by performing a depth first traversal of the first directory 106. The multi-level directory restore operation 120 restores the first file 108, the second file 110, and the first subdirectory 112 within the first directory 106 of the restored volume 122. The multi-level directory restore operation 120 also restores the third file 114 and the fourth file 116 within the first subdirectory 112 of the restored volume 122. The multi-level directory restore operation 120 is capable of creating the restore volume 122 even though the multi-level directory restore operation 120 targets objects stored across the standard storage tier 140 and the archival storage tier 144. For example, when a restore operation to restore an object to the restored volume 122 fails, a list of remaining objects (i.e., unrestored objects) to restore are identified and tracked using an object identifier map. The restore operation may fail because the object may not be stored in the standard storage tier 140 and may be in the archival storage tier 144 that is not directly accessible to the restore operation. Accordingly, a command is issued to the cloud endpoint 102 to transfer (also referred to as hydration) the tracked objects within the object identifier map from the archival storage tier 144 to the standard storage tier 140. The restore operation is failed and is reissued after a predicted timespan to transfer the objects d to the standard storage tier 140. In this way, the reissued restore operation is successfully completed because the remaining objects are transferred to the standard storage tier 140 that is accessible to the restarted restore operation.

Figure 3A:
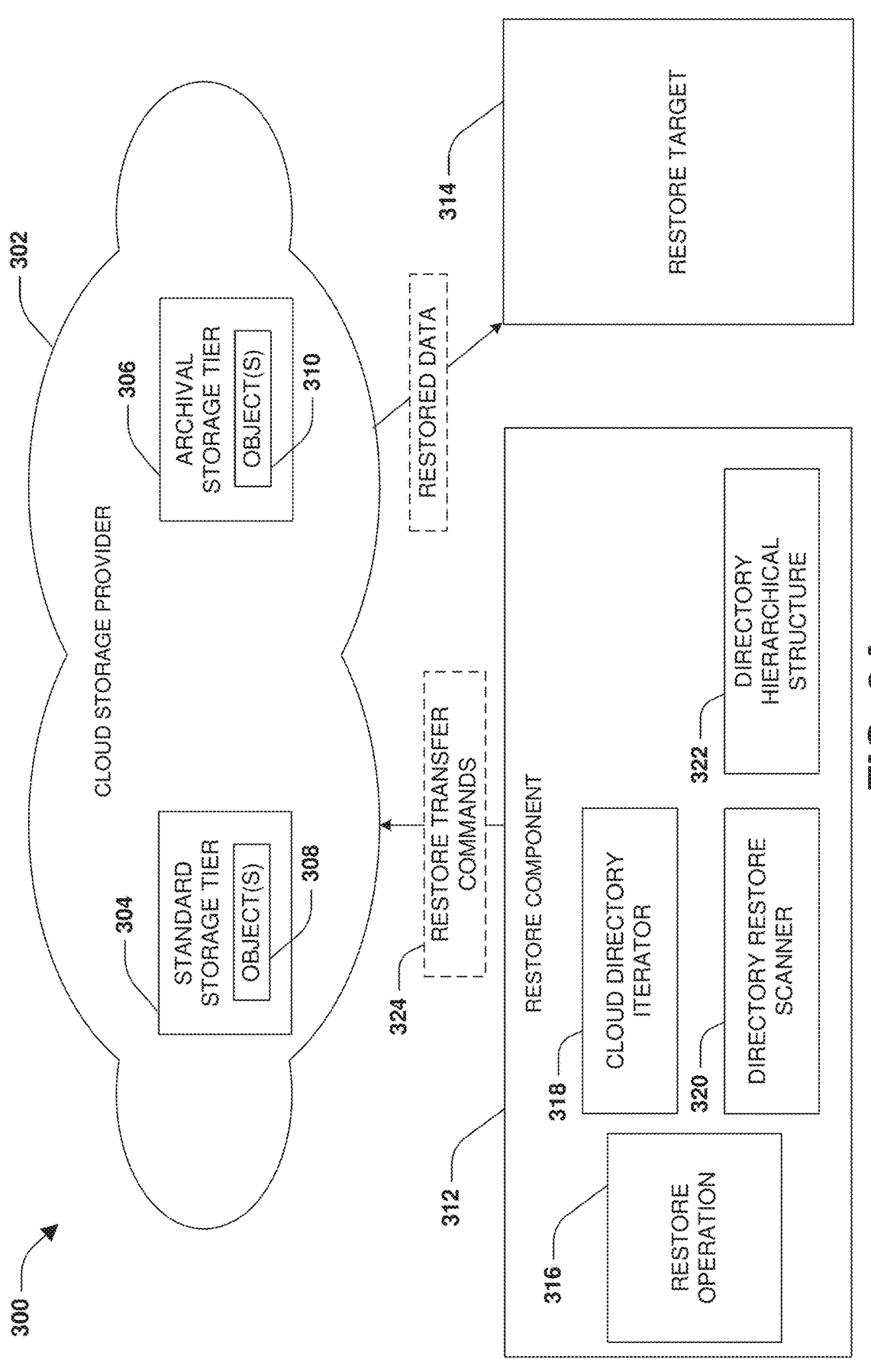
FIGS. 3A-3D are block diagrams illustrating an example of a system for performing a multi-level directory restore operation targeting objects stored across multiple storage tiers in accordance with an embodiment of the present technology.

FIG. 2 is a flow chart illustrating an example method 200 for performing a storage operation targeting objects stored across multiple storage tiers, which is described on conjunction with the system 300 of FIGS. 3A-3D. A cloud storage provider 302 hosts various storage tiers within which data can be stored as objects, as illustrated by FIG. 3A. In some embodiments, a volume is backed up as objects 308 stored within a standard storage tier 304 (similar to 140, FIG. 1) and objects 310 stored within an archival storage tier 306 (similar to 144, FIG. 1) of the cloud storage provider 302. The archival storage tier 306 may provide lower cost, slower storage that may be used for long term storage for infrequently accessed objects, while the standard storage tier 304 provides higher cost, faster storage that may be used for storing frequently accessed objects. A restore component 312 may be configured to implement a restore operation 316 to restore a directory and one or more subdirectories of the directory. The restore component 312 may be configured to directly access the standard storage tier 304 and may not have direct access to the archival storage tier 306.

The restore operation 316 may be implemented to restore a directory of the volume to a restore target 314. The restore operation 316 may be implemented as a multi-level directory restore operation that can restore an entire directory hierarchical structure 322 of content items (e.g., files and subdirectories) within and nested within the directory. As part of implementing the restore operation 316, identifiers of the content items are obtained from a cloud directory iterator 318. In some embodiments, the content items are backed up as snapshot data into the objects stored across the standard storage tier 304 and the archival storage tier 306.

During operation 202 of method 200, a depth first traversal of the directory and the one or more subdirectories (e.g., a traversal of the directory hierarchical structure 322) is performed. It may be appreciated that an embodiment of the depth first traversal is described below in relation to FIGS. 4A-4H. In some embodiments, a directory restore scanner 320 traverses the directory (i.e., the directory hierarchical structure 322) as part of the restore operation 316. In some embodiments, the restore operation 316 is implemented at an object level granularity so that the restore operation 316 supports restoring the directory using the objects that are stored across different storage tiers of the cloud storage provider 302. In some embodiments, the depth first traversal is implemented by the restore operation 316 as a logical traversal of the directory.

During operation 204 of method 200, the restore operation 316 implements the depth first traversal to issue restore transfer commands 324 to the cloud storage provider 302 for restoring the directory and subdirectory content items (e.g., files and subdirectories) from a first storage tier of the object store (e.g., the standard storage tier 304) to the restore target 314. A restore transfer command may comprise a single file restore command to restore a content item (e.g., a single file or subdirectory) encountered during the depth first traversal from an object within the object store. The single file restore operations are issued as restore transfer commands 324 using the identifiers of the directory and subdirectory content items (e.g., files and subdirectories).

Figure 3B:
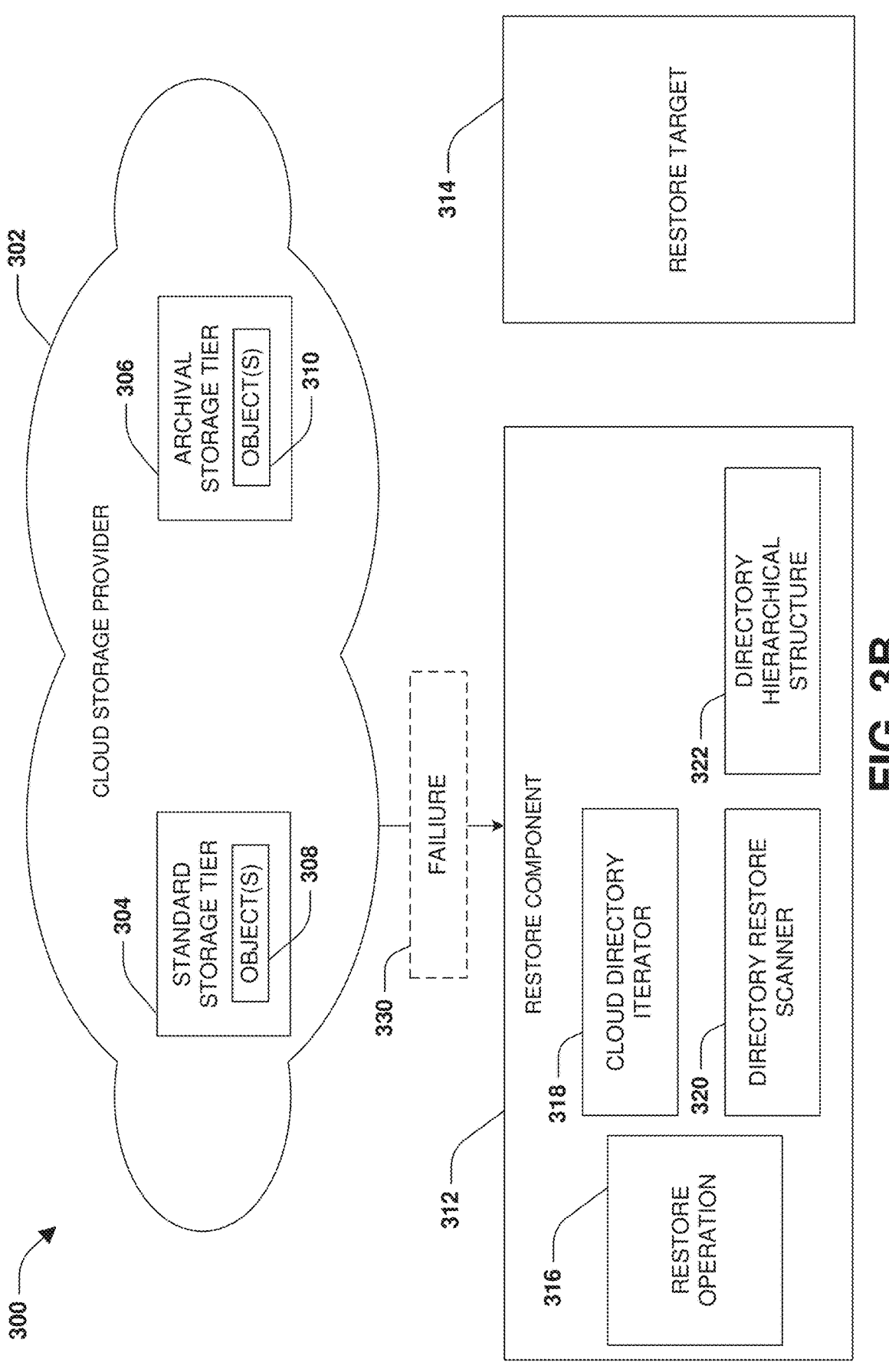

During operation 206 of method 200, a status of the restore transfer commands 324 (e.g., the single file restore operation) is monitored to detect whether a failure indication 330 is received, as illustrated by FIG. 3B. If no failure indication is received, then the restore operation 316 continues to restore the directory and subdirectory until completion. If the failure indication 330 is received for a restore transfer command, a determination is made that an object targeted by the restore transfer command is not stored within the first storage tier (e.g., the standard storage tier 304) and is instead stored within a second storage tier (e.g., the archival storage tier 306). The failure indication 330 is an indication from the cloud storage provider 302 that the object is not stored within the standard storage tier 304.

Figure 3C:
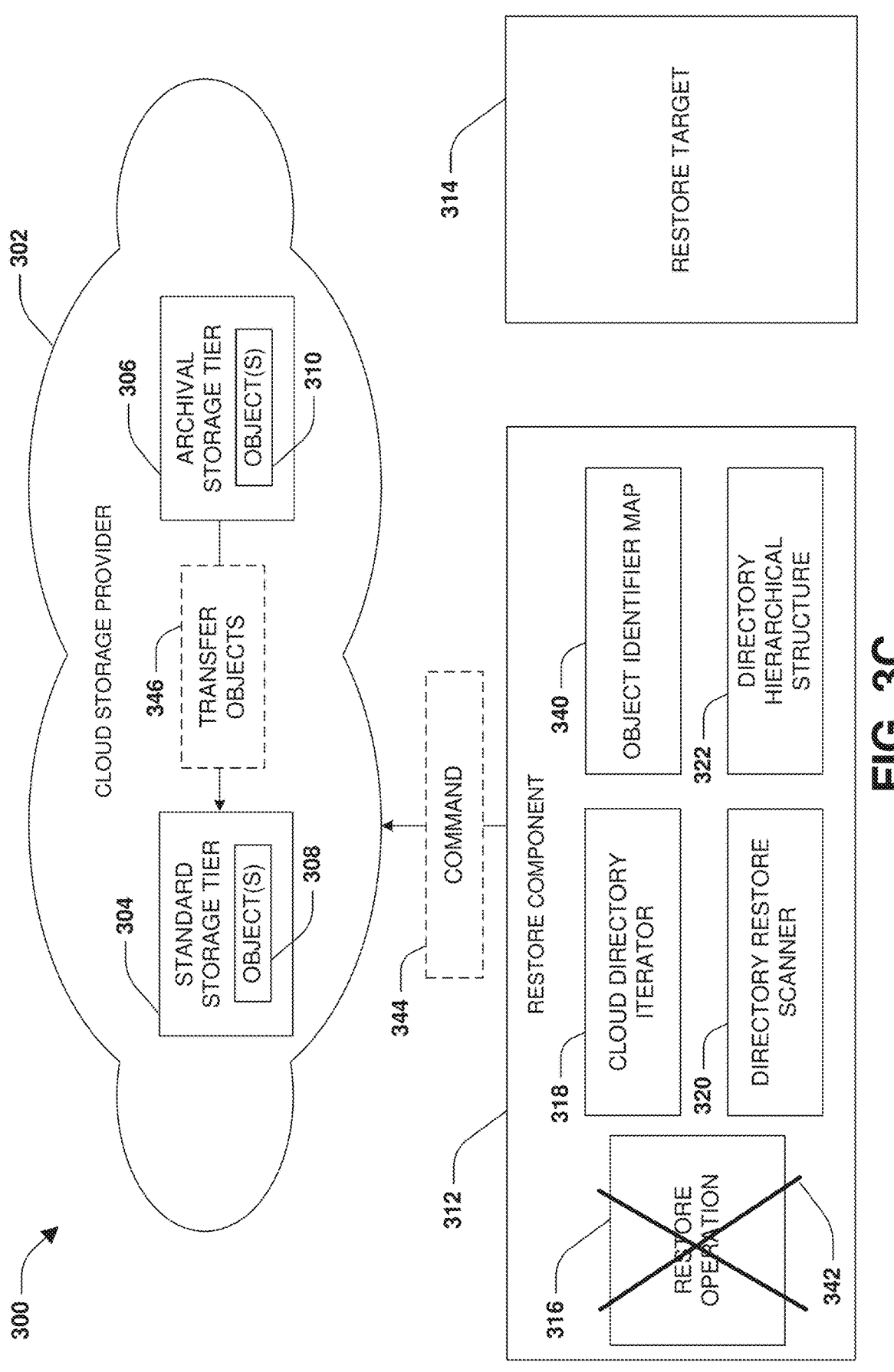

During operation 208 of method 200, in response to receiving the failure indication 330, an object identifier map 340, illustrated by FIG. 3C, is generated. The object identifier map 340 includes object identifiers of unrestored objects targeted by the restore operation 316 and while the depth first traversal is taking place. As part of generating the object identifier map 340, a set of identifiers are obtained from the cloud directory iterator 318 for unrestored content items. Object identifiers of unrestored objects storing data for the unrestored content items identified by the set of identifiers are identified (e.g., an object identifier of an unrestored object storing a file not yet restored). The object identifiers are saved in the object identifier map 340. In some embodiments, the object identifier map 340 is populated with file identifiers of files (or object identifiers of objects storing data of the files) not yet restored by the restore operation 316. In some embodiments of generating the object identifier map 340, pointers that represent the directory being restored (e.g., represent the unrestored content items of the directory) are collected. The pointers may represent the unrestored content items of the directory. A set of objects comprising data pointed to by the pointers are identified. In this way, the object identifier map is generated based upon the set of objects pointed to by the pointers.

During operation 210 of method 200, the restore operation 316 is failed 342 and a command 344 is issued to the cloud storage provider 302 to move or copy objects identified by the object identifier map 340 from the archival storage tier 306 to the standard storage tier 304. In some embodiments, the object identifiers are read from the object identifier map 340 in response to the depth first traversal reaching the end of the directory. Accordingly, one or more commands such as the command 344 are issued to the cloud storage provider 302 to move unrestored objects from the archival storage tier 306 to the standard storage tier 304 when the unrestored objects not being in the standard storage tier 304. The one or more commands cause the cloud storage provider 302 to transfer 346 the unrestored objects to the standard storage tier 304. The one or more commands are issued for rehydrating the unrestored objects to the standard storage tier 304 so that the directory restore scanner 320 refrains from performing slower and more expensive data copy operations for restoring the unrestored objects from the archival storage tier 306. Instead, the directory restore scanner 320 executes faster and cheaper operations upon the unrestored objects 350 that are rehydrated to the standard storage tier 304.

Figure 3D:
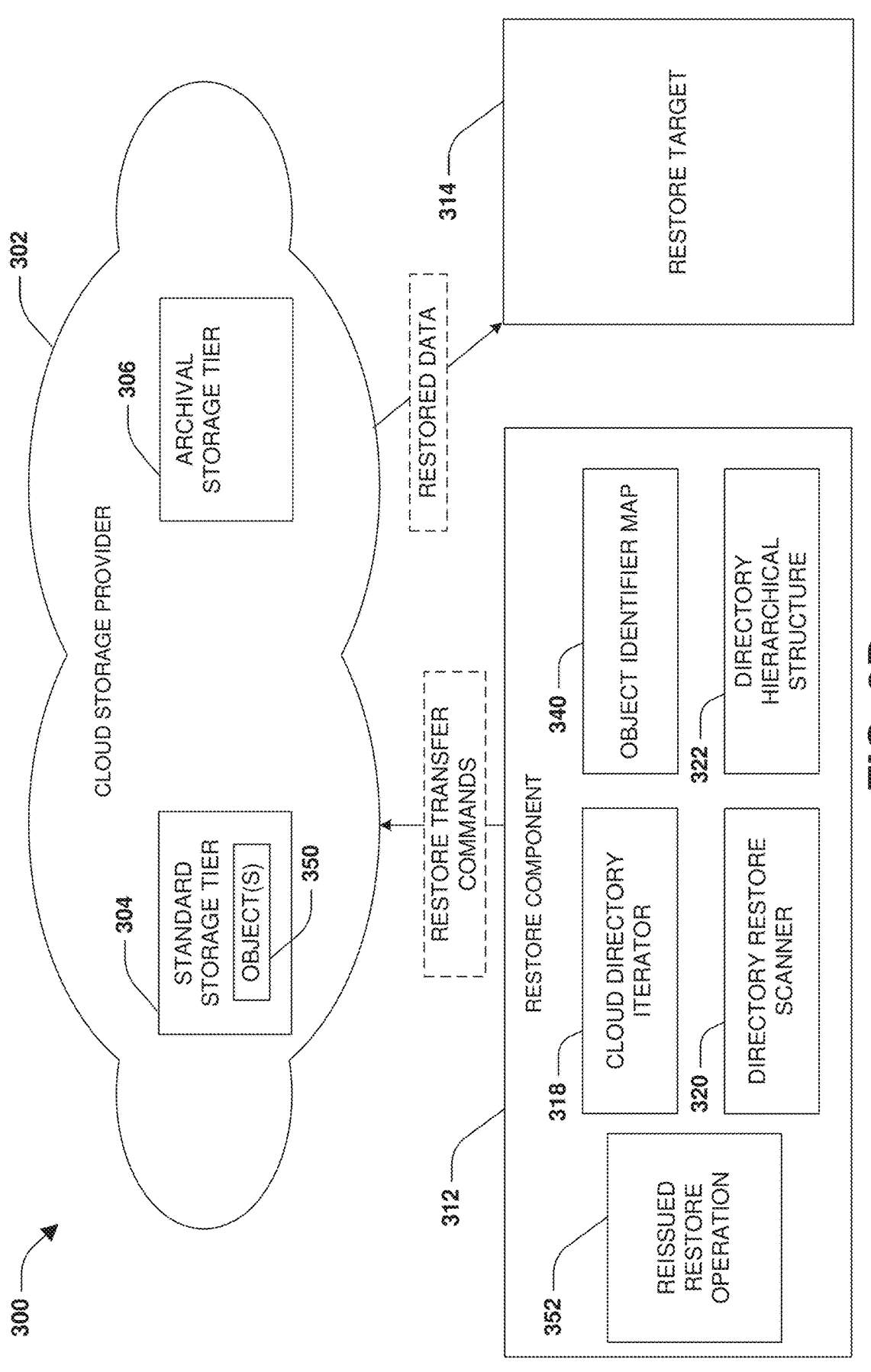

The restore component 312 may determine an amount of time for the cloud storage provider 302 to complete the transfer 346. The restore component 312 waits that amount of time, and then reissues the restore operation 316 as a reissued restore operation 352 targeting the remaining unrestored objects 350 now residing in the standard storage tier 304, during operation 212 of method 200 and as illustrated by FIG. 3D. The reissued restore operation 352 skips objects already restored by the restore operation 316 before the failure. In this way, the reissued restore operation 352 restores data from the remaining unrestored objects 350 to the restore target 314 to complete the restoration of the directory.

Figure 4A:
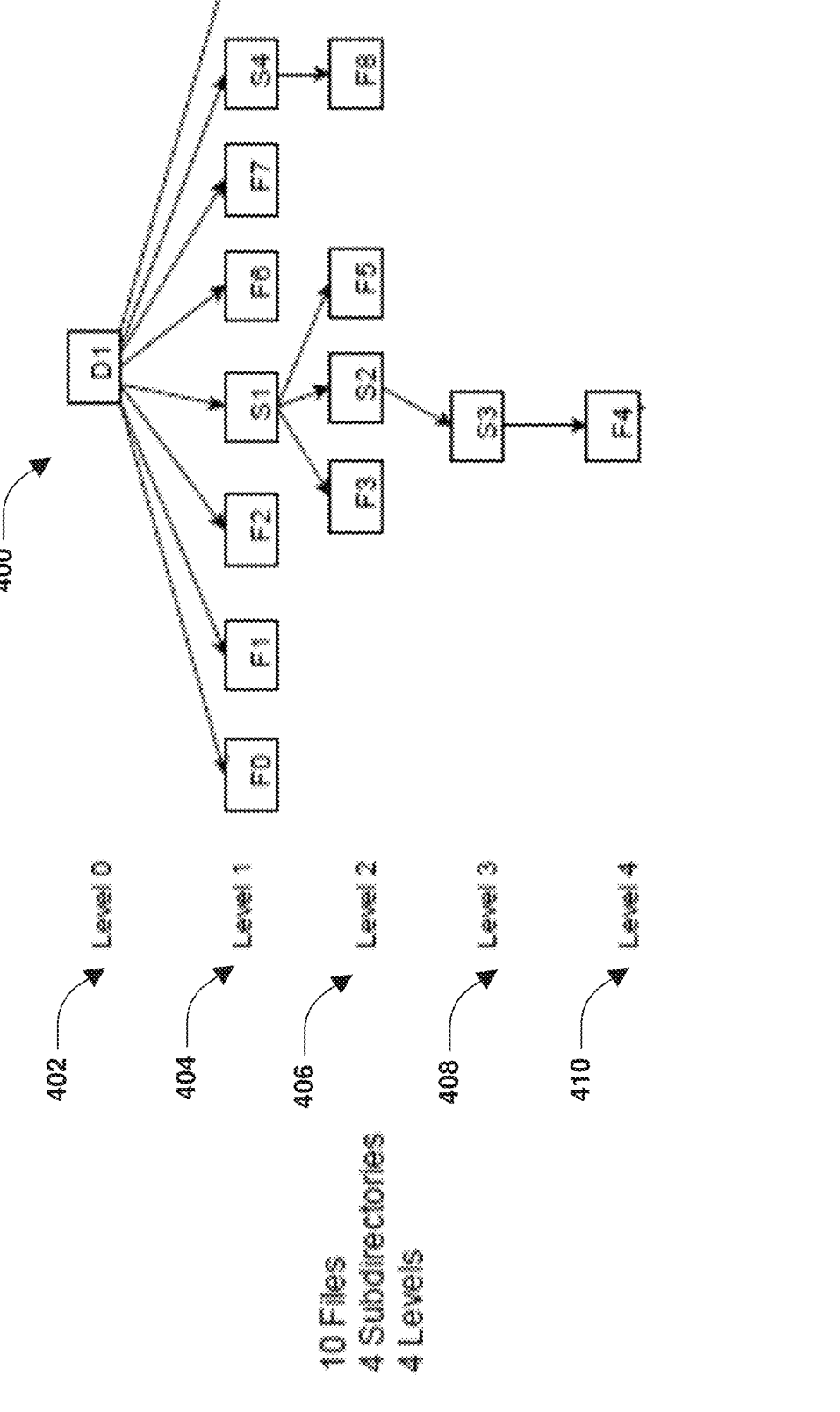
FIGS. 4A-4H are block diagrams illustrating an example of performing a multi-level directory restore operation targeting objects stored across multiple storage tiers in accordance with an embodiment of the present technology.

FIGS. 4A-4H are block diagrams illustrating an example of a system 400 for performing a multi-level directory restore operation 120 targeting objects stored across multiple storage tiers (e.g., the restore operation 316 targeting objects stored within multiple storage tiers of the cloud storage provider 302). The multi-level directory restore operation 120 performs a depth first traversal of a directory hierarchical structure 400 of a directory D1, as illustrated by FIG. 4A. The directory D1 includes multiple levels, such as level (0) 402 that includes the directory D1. The directory hierarchical structure 400 includes a level (1) 404 that includes a file F0, a file F1, a file F2, a subdirectory S1, a file F6, a file F7, a subdirectory S4, and a file F9. The directory hierarchical structure 400 includes a level (2) 406 that includes a file F3 of the subdirectory S1, a subdirectory S2 of the subdirectory S1, a file F5 of the subdirectory S1, and a file F8 of the subdirectory S4. The directory hierarchical structure 400 includes a level (3) 408 that includes a subdirectory S3 of the subdirectory S2. The directory hierarchical structure 400 includes a level (4) 410 that includes a file F4 of the subdirectory S3. The multi-level directory restore operation 120 restores the entire directory hierarchical structure 400 of the directory D1. The multi-level directory restore operation 120 can be resumed/restarted after a failure where the multi-level directory restore operation left off before the failure.

Figure 4B:
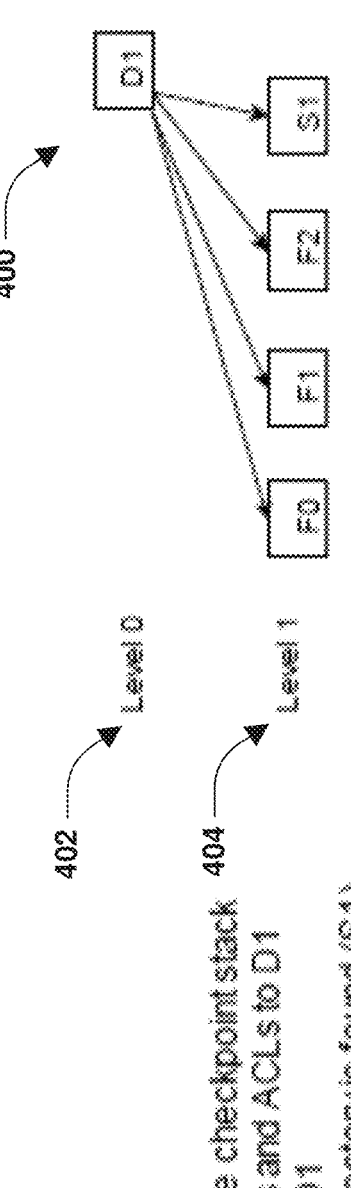

FIG. 4B shows a checkpoint stack 420 or other data structure to track progress of the multi-level directory restore operation. The directory D1 (e.g., an instance metafile or entry for the directory D1) is pushed onto the checkpoint stack 420. Streams and access control lists (ACLs) are restored to the directory D1. The access control lists are used to enable or deny access to files, directories and subdirectories. The directory D1 is iterated through until the subdirectory S1 within the directory D1 is reached. Accordingly, file F0, file F1, and file F2 within the directory D1 are restored. The subdirectory S1 (e.g., an instance metafile or entry for the subdirectory S1) is pushed onto the stack 420. The subdirectory S1 is created/restored, and access control lists and streams are restored to the subdirectory S1.

Figure 4C:
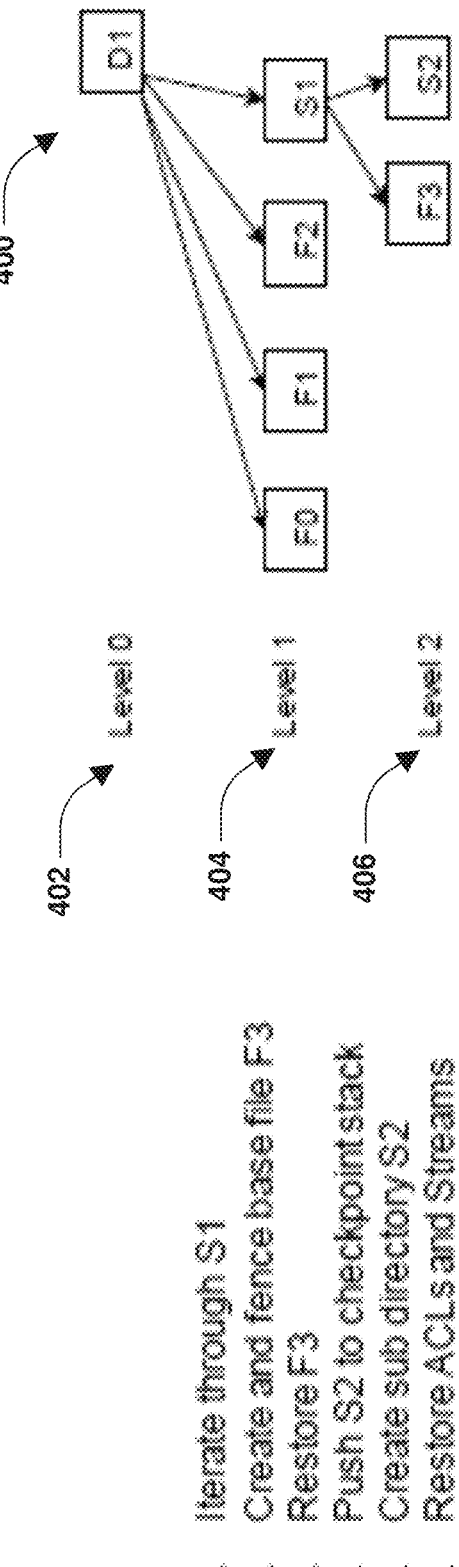

Next, the subdirectory S1 is iterated through, as illustrated by FIG. 4C. The file F3 within the subdirectory S1 is created and restored. The subdirectory S2 within the subdirectory S1 (e.g., an instance metafile or entry for the subdirectory S2) is pushed onto the checkpoint stack 420. The subdirectory S2 is then created/restored, and access control lists and streams are restored to the subdirectory S2.

Figure 4D:
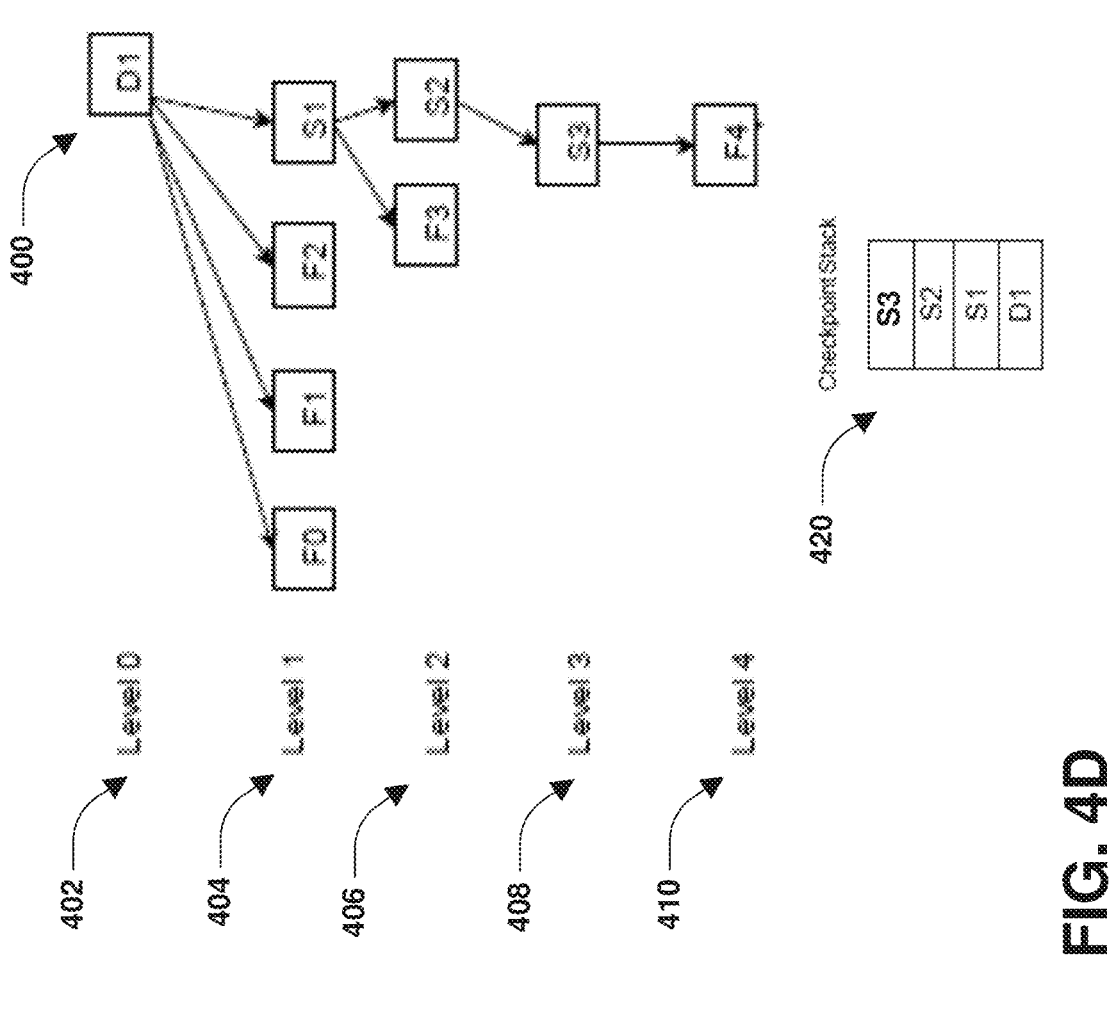

Next, the subdirectory S2 is iterated through, as illustrated by FIG. 4D. The subdirectory S3 (e.g., an instance metafile or entry for the subdirectory S3) is encountered and is pushed onto the checkpoint stack 420. The subdirectory S3 is created, and access control lists and streams are restored to the subdirectory S3. The subdirectory S3 is iterated through and the file F4 within the subdirectory S4 is created and restored.

Figure 4E:
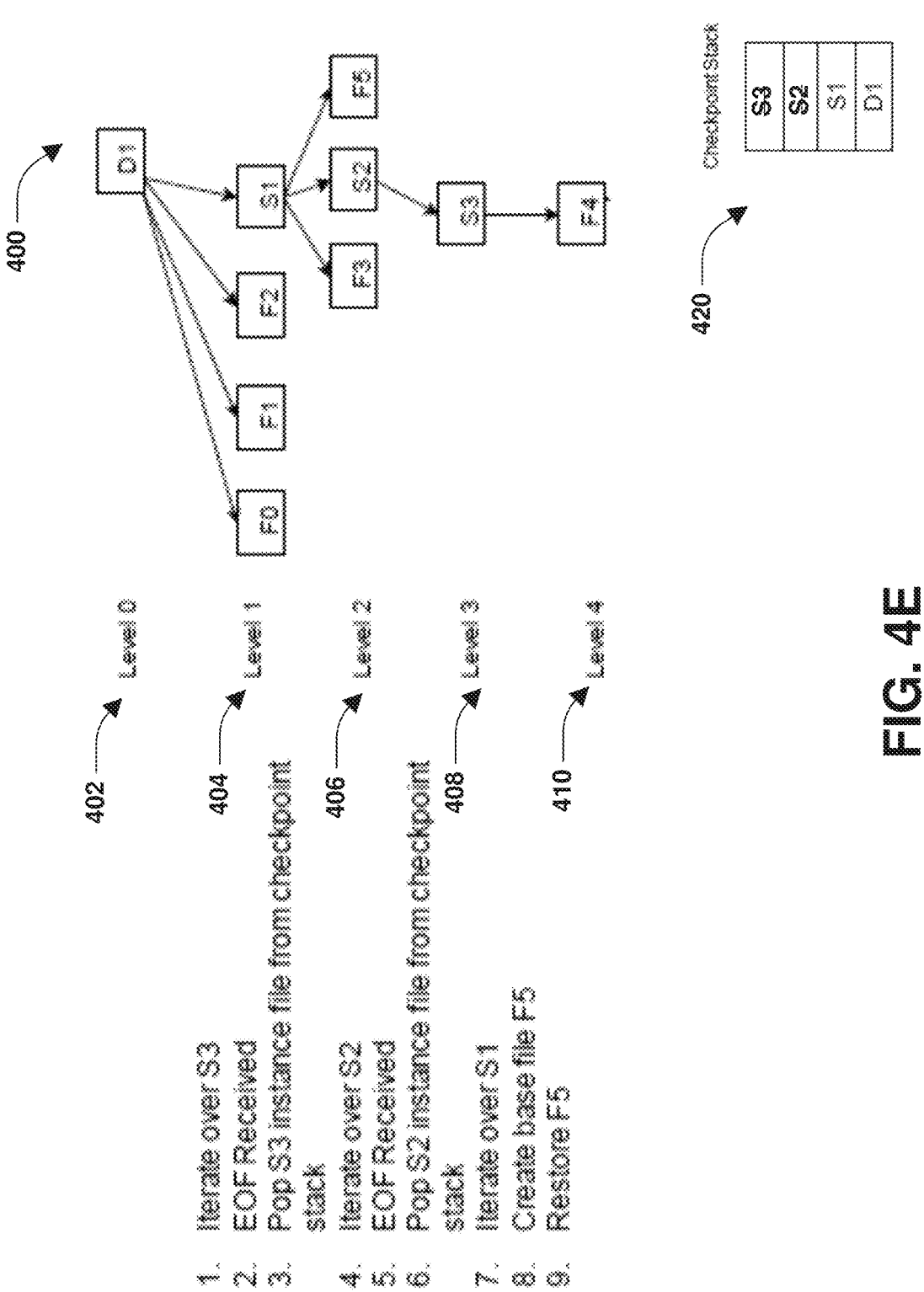

As part of iterating over the subdirectory S3, an end of file is received after file F4 is restored because there are no further files or subdirectories within the subdirectory S3 branch to restore, as illustrated by FIG. 4E. Accordingly, the subdirectory S3 (e.g., the instance metafile or entry for the subdirectory S3) is removed (or popped) from the checkpoint stack 420. The subdirectory S2 is iterated over, and an end of file is received because there are no more files or subdirectories under the subdirectory S2 branch to restore.

Accordingly, the subdirectory S2 (e.g., the instance metafile or entry for the subdirectory S2) is removed from the checkpoint stack 420. The subdirectory S1 is iterated over, and the file F5 within the subdirectory S1 is created and restored.

Figure 4F:
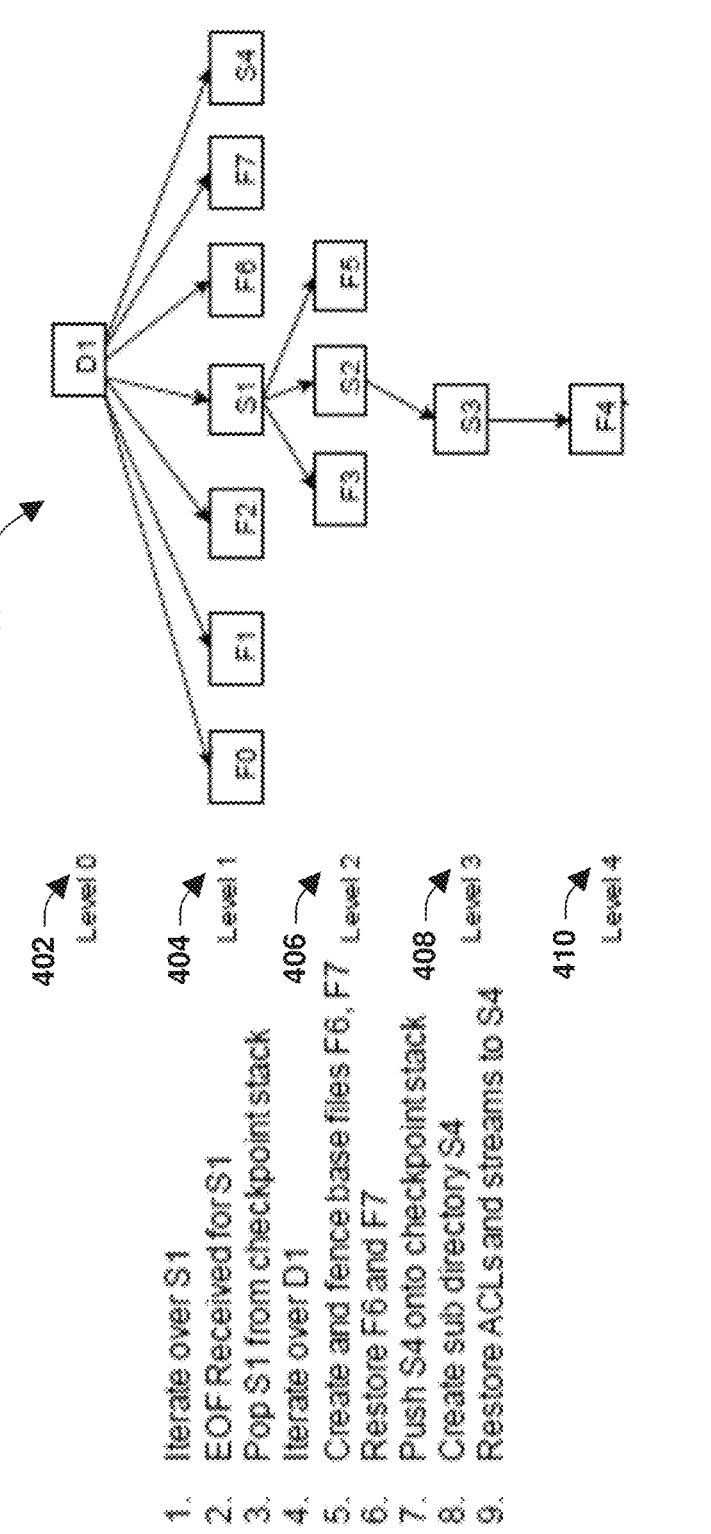

As part of iterative the subdirectory S1, an end of file is received for the subdirectory S1 because there are no more files or subdirectories under the subdirectory S1 branch to restore, as illustrated by FIG. 4F. Accordingly, the subdirectory S1 (e.g., the instance metafile or entry for the subdirectory S1) is removed from the checkpoint stack 420. The directory D1 is further iterated, and the file F6 and the file F7 are created and restored. The subdirectory S4 (e.g., the instance metafile or entry for the subdirectory S4) is pushed onto the checkpoint stack 420. The subdirectory S4 is created, and access control lists and streams are restored to the subdirectory S4.

Figure 4G:
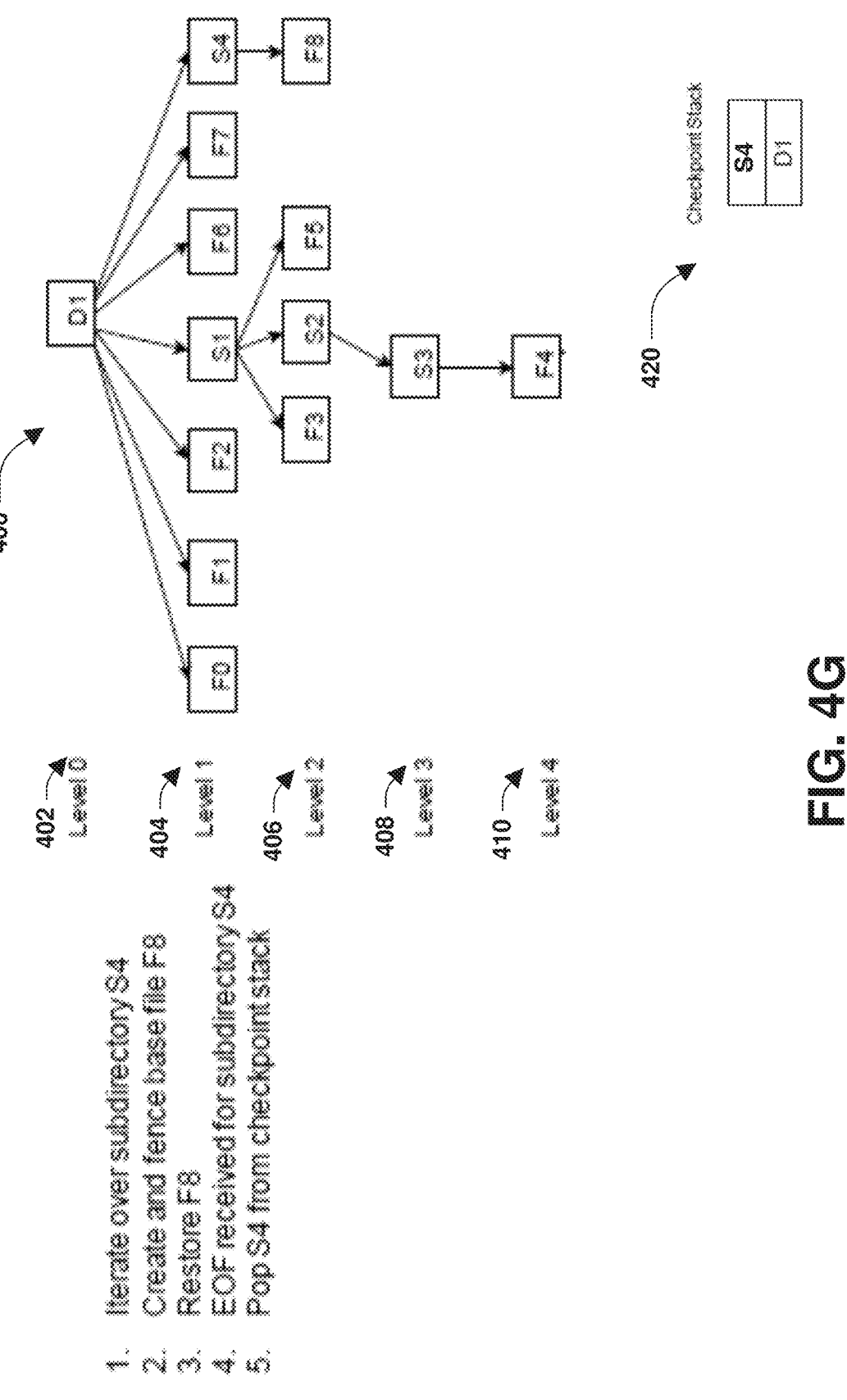

While iterating the subdirectory S4, the file F8 is created and restored, as illustrated by FIG. 4G. An end of file is received for the subdirectory S4 because there are no more files or subdirectories under the subdirectory S4 branch to restore. Accordingly, the subdirectory S4 (e.g., the instance metafile or entry for the subdirectory S4) is removed from the checkpoint stack 420.

Figure 4H:
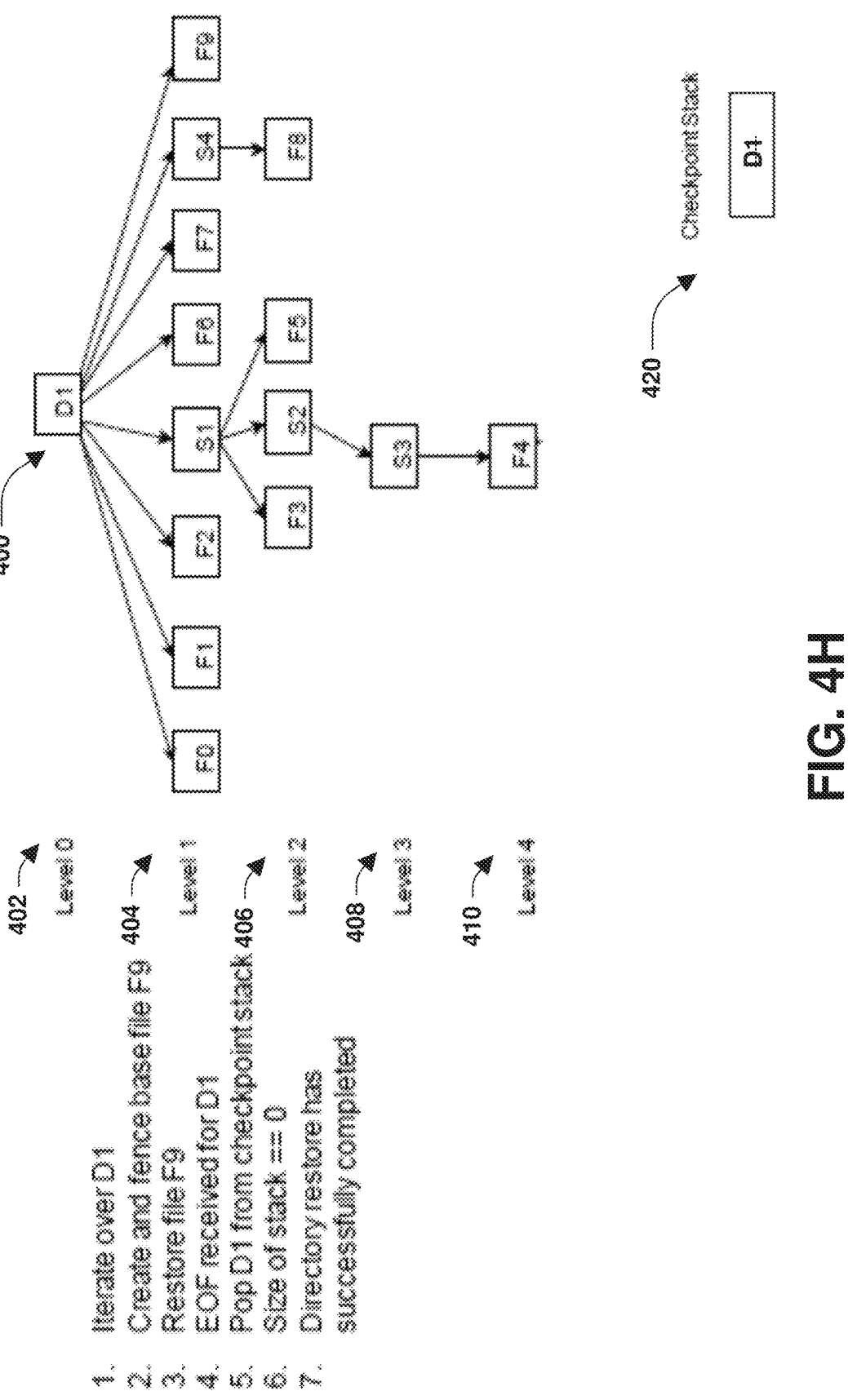

As part of iterating over the directory D1, the file F9 is created and restored, as illustrated by FIG. 4H. An end of file is received for the directory D1. Accordingly, the directory D1 (e.g., the instance metafile or entry for the directory D1) is removed from the checkpoint stack 420. In response to determining that the checkpoint stack 402 has a size of 0, the multi-level directory restore operation is designated as complete. If a failure had occurred during the multi-level directory restore operation, the checkpoint stack 420 (e.g., an instance metafile) is used to resume the multi-level directory restore operation from where the multi-level directory restore operation left off before the failure.

Figure 5:
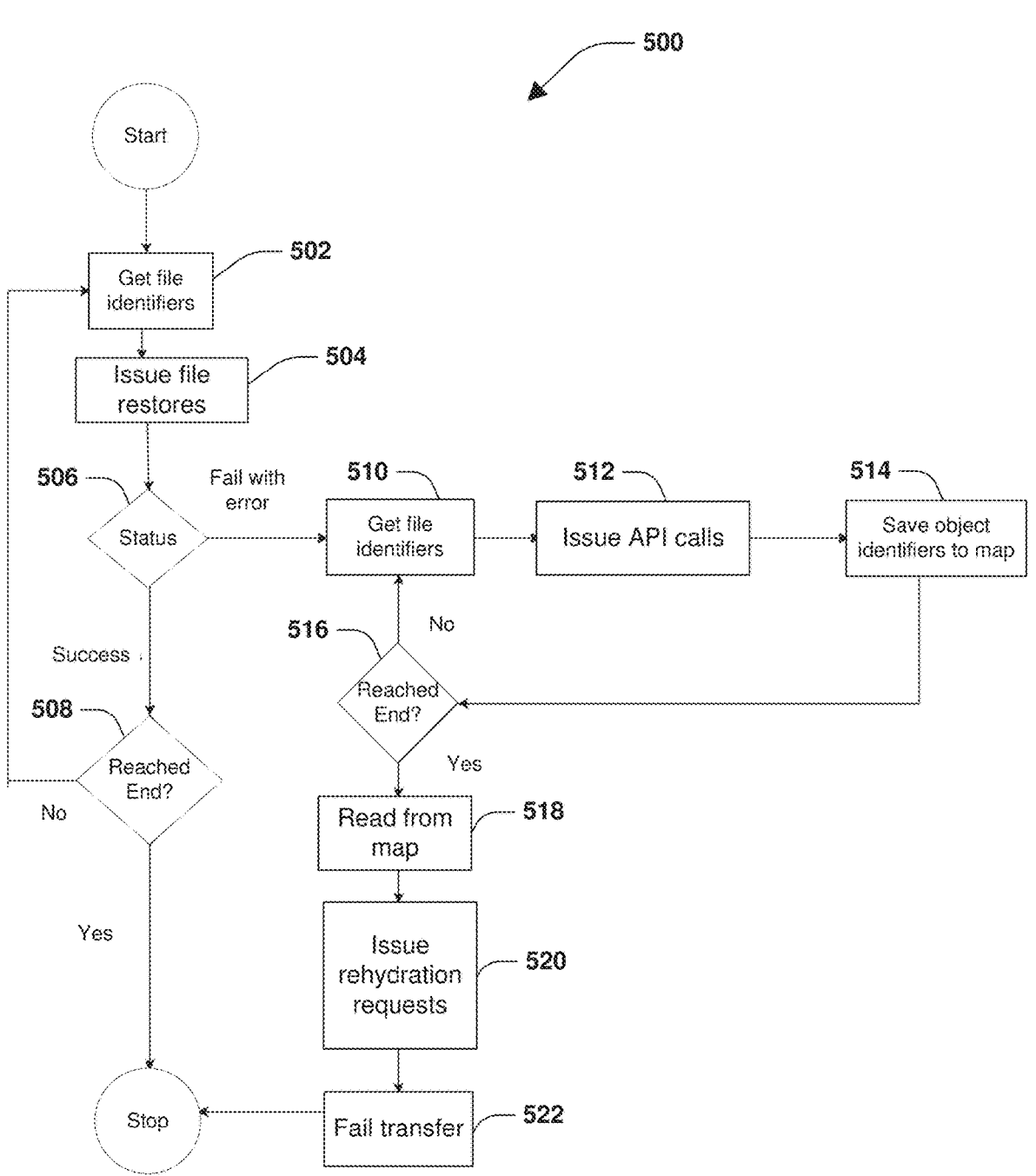
FIG. 5 is a flow chart illustrating an example method for performing a storage operation targeting objects stored across multiple storage tiers in accordance with an embodiment of the present technology.

FIG. 5 is a flow chart illustrating an example method 500 for performing a storage operation targeting objects stored across one or more storage tiers of a cloud storage environment. During operation 502, file identifiers of files of a directory to be restored are obtained, such as from a base metafile. During operation 504, file restore operations are issued for the file identifiers to restore corresponding files (e.g., data files, directories, and/or subdirectories) from objects within an object store of the cloud storage environment. During operation 506, a determination is made as to whether the file restore operations had a failure status or a success status. In response to receiving a success status for a file restore operation, a determination is made as to whether an end of file for the directory is reached, during operation 508. If the end of file is reached for the directory, then the storage operation is complete. If the end of file has not been reached, then additional file identifiers are obtained for issuing more file restore operations.

If a failure status is received, then remaining file identifiers are obtained, during operation 510. The failure status may correspond to a situation where a file restore operation targets a file stored within an object that is currently being stored within an archival storage tier of the cloud storage environment and is not stored within a standard storage tier directly accessible to the file restore operation. During operation 512, API (application programming interface) calls are issued for the file identifiers to identify object identifiers of objects storing files identified by the file identifiers. The object identifiers are saved to a map during operation 514. During operation 516, a determination is made as to whether an end of file has been reached. If the end of file has not been reached, then additional file identifiers are obtained for issuing more file restore operations. If the end of file has been reached, then the object identifiers are read from the map, during operation 518. During operation 520, rehydration requests are issued to the cloud storage environment for transferring corresponding objects from the archival storage tier to the standard storage tier. During operation 522, a transfer of the storage operation is failed, and the storage operation will be restarted for resuming at a checkpoint where the failure occurred for the file restore operation. The resumed storage operation will now be able to successfully issue file restore operations to the objects that have now been transferred from the archival storage tier to the standard storage tier.

Figure 6:
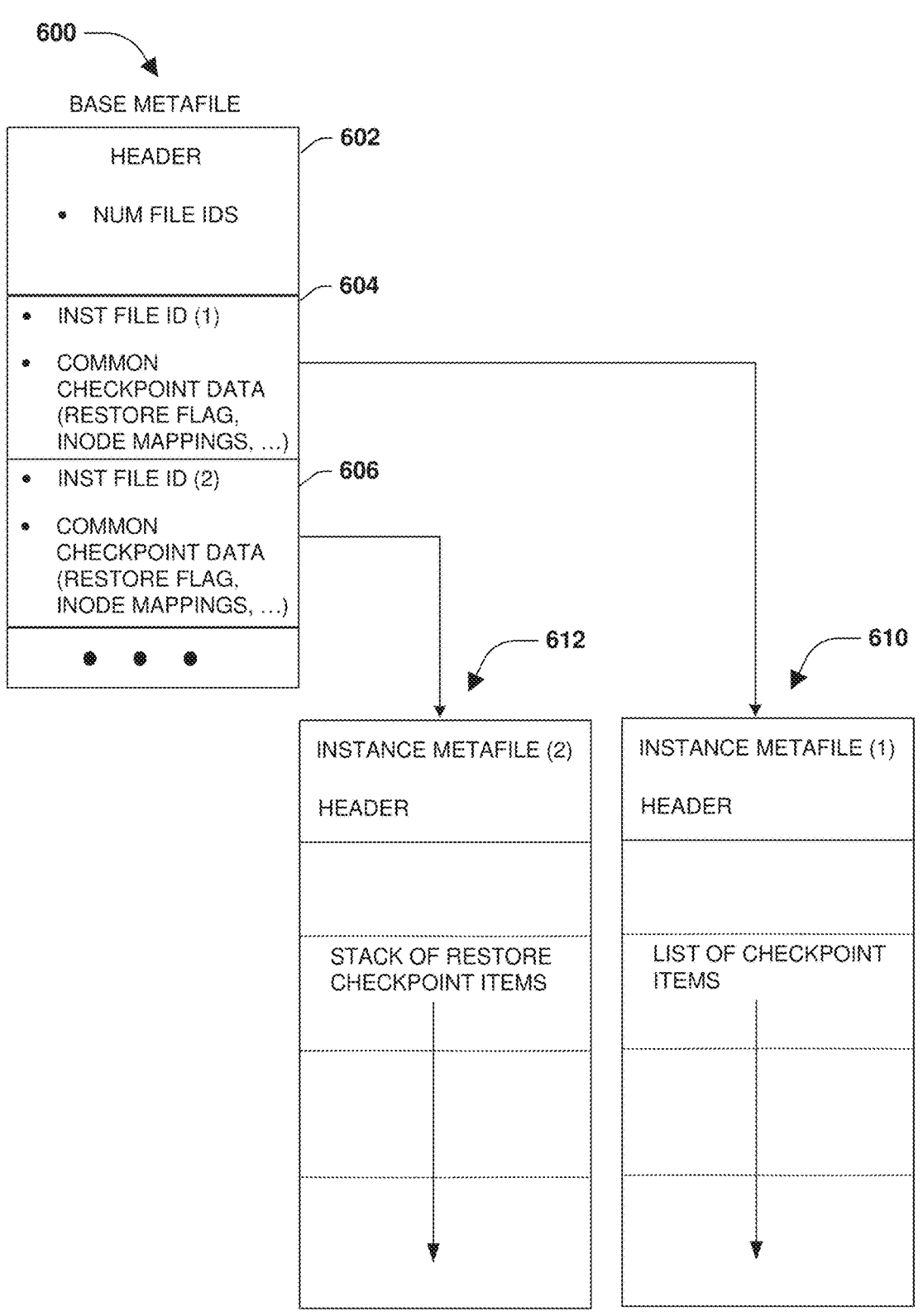
FIG. 6 is a block diagram illustrating metafiles used for performing a storage operation targeting objects stored across multiple storage tiers in accordance with an embodiment of the present technology.

FIG. 6 is a block diagram illustrating metafiles used for performing a storage operation targeting objects stored across multiple storage tiers. In some embodiments, the metafiles may be used to track a depth first traversal of a directory being restored by the storage operation. A base metafile 600 includes a header 602. The header 602 is populated with file identifiers of directories that are to be processed by instances of the storage operation (e.g., a first file identifier of a first directory tracked using a first base entry 604, a second file identifier of a second directory tracked using a second base entry 606, etc.). The base metafile 600 includes base entries that are fixed size entries for checkpoint data, and are used to store common checkpoint data that does not need a specific data structure. For example, the base metafile 600 includes the first base entry 604, the second base entry 606, and/or other base entries. The first base entry 604 comprises common checkpoint data for restoring the first directory such as a restore flag, inode mappings, etc. The second base entry 606 comprises common checkpoint data for restoring the second directory such as a restore flag, inode mappings, etc.

The first base entry 604 includes a first instance file identifier used to access a first instance metafile 610. The first instance metafile 610 is constructed according to a particular data structure such as a list of checkpoint items used to track sub operations of a storage operation being implemented to restore the first directory. The second base entry 606 includes a second instance file identifier used to access a second instance metafile 612. The second instance metafile 612 is constructed according to a particular data structure such as a stack of restore checkpoint items used to track sub operations of a storage operation being implemented to restore the second directory.

In some embodiments, a method is provided. The method includes executing a depth first traversal of a directory and one or more sub-directories for a restore operation utilizing objects storing snapshot data of a volume comprising the directory, the objects stored within an object store of a cloud storage provider; issuing, by the depth first traversal, one or more restore transfer commands to the cloud storage provider for restoring directory and subdirectory content items from a first storage tier of the object store; determining that an object targeted by the restore operation is stored within a second storage tier of the object store, in response to the cloud storage provider indicating that the object is not stored in the first storage tier; generating an object identifier map with object identifiers of unrestored objects targeted by the restore operation while continuing with the depth first traversal; failing the restore operation and issuing a command to the cloud storage provider to move objects identified by the object identifier map from the second storage tier to the first storage tier; and reissuing the restore operation as a reissued restore operation to restore data from the unrestored objects.

In some embodiments, the first storage tier is directly accessible to the restore operation and the second storage tier is inaccessible to the restore operation.

In some embodiments, the first storage tier is a standard cloud storage tier and the second storage tier is an archival cloud storage tier.

In some embodiments, the restore transfer commands comprise a single file restore command for each content item encountered during the depth first traversal.

In some embodiments, the reissued restore operation skip restored objects before the restore operation fails.

In some embodiments, the method includes determining an amount of time for the cloud storage provider to complete the command; and in response to waiting the amount of time, reissuing the restore operation.

In some embodiments, the object identifier map is populated with object identifiers that constitutes all data for files in the second storage tier that are not yet restored by the restore operation.

In some embodiments, the restore operation is implemented at an object granularity and the restore operation supports restoring the directory using objects that are stored across multiple different storage tiers.

In some embodiments, the method includes in response to the cloud storage provider indicating that the object is not stored in the first storage tier, collecting pointers that represent the directory being restored; identifying a set of objects comprising data pointed to by the pointers; and creating the object identifier map based upon the set of objects pointed to by the pointers.

In some embodiments, the pointers represent unrestored content items of the directory.

In some embodiments, the depth first traversal is a logical traversal of the directory.

In some embodiments, non-transitory machine readable medium is provided. The non-transitory machine readable medium comprises instructions for performing a method, which when executed by a machine, causes the machine to perform operations. The operations include obtaining identifiers of content items within a directory from a cloud directory iterator for a restore operation utilizing objects storing snapshot data of a volume comprising the directory, the objects stored within an object store of a cloud storage provider; issuing single file restore operations for each content item using the identifiers; monitoring a status of the single file restore operations; in response to receiving a failure indication associated with an object targeted by a single file restore operation, continuing to traverse the directory until reaching an end of the directory by: obtaining a set of identifiers from the cloud directory iterator for unrestored content items; obtaining object identifiers for unrestored objects storing data for the unrestored content items identified by the set of identifiers; and saving the object identifiers into an object identifier map; in response to reaching the end of the directory, reading the object identifiers from the object identifier map; and issuing one or more commands to the cloud storage provider to move the unrestored objects to a first storage tier from a second storage tier of the object store based upon the unrestored objects not being in the first storage tier.

In some embodiments, the operations include in response to issuing the one or more commands, failing the restore operation.

In some embodiments, the operations include in response to the one or more commands completing, reissuing the restore operation to restore data from remaining unrestored objects.

In some embodiments, a directory restore scanner traverses the directory as part of the restore operation, where the first storage tier is a standard storage tier and the second storage tier is an archival storage tier, and where the issuing the one or more commands comprises issuing the one or more commands for transferring the unrestored objects from the archival storage tier to the standard storage tier so that the directory restore scanner refrains from restoring the unrestored objects from the archival storage tier, and where the directory restore scanner operates on the unrestored objects transferred to the standard storage tier from the archival storage tier.

In some embodiments, a computing device is provided. The computing device includes a memory storing instructions and a processor coupled to the memory, the processor configured to execute the instructions to perform operations. The operations include executing a depth first traversal of a directory and one or more sub-directories for a restore operation utilizing objects storing snapshot data of a volume comprising the directory, the objects stored within an object store of a cloud storage provider; issuing, by the depth first traversal, one or more restore transfer commands to the cloud storage provider for restoring directory and subdirectory content items from a first storage tier of the object store; determining that an object targeted by the restore operation is stored within a second storage tier of the object store, in response to the cloud storage provider indicating that the object is not stored in the first storage tier; generating an object identifier map with object identifiers of unrestored objects targeted by the restore operation while continuing with the depth first traversal; failing the restore operation and issuing a command to the cloud storage provider to move objects identified by the object identifier map from the second storage tier to the first storage tier; and reissuing the restore operation as a reissued restore operation to restore data from the unrestored objects.

In some embodiments, the first storage tier is directly accessible to the restore operation and the second storage tier is inaccessible to the restore operation.

In some embodiments, the first storage tier is a standard cloud storage tier and the second storage tier is an archival cloud storage tier.

In some embodiments, the restore transfer commands comprise single file restore commands for each content item encountered during the depth first traversal.

In some embodiments, the reissued restore operation skip objects already restored by the restore operation before failing the restore operation.

Figure 7:
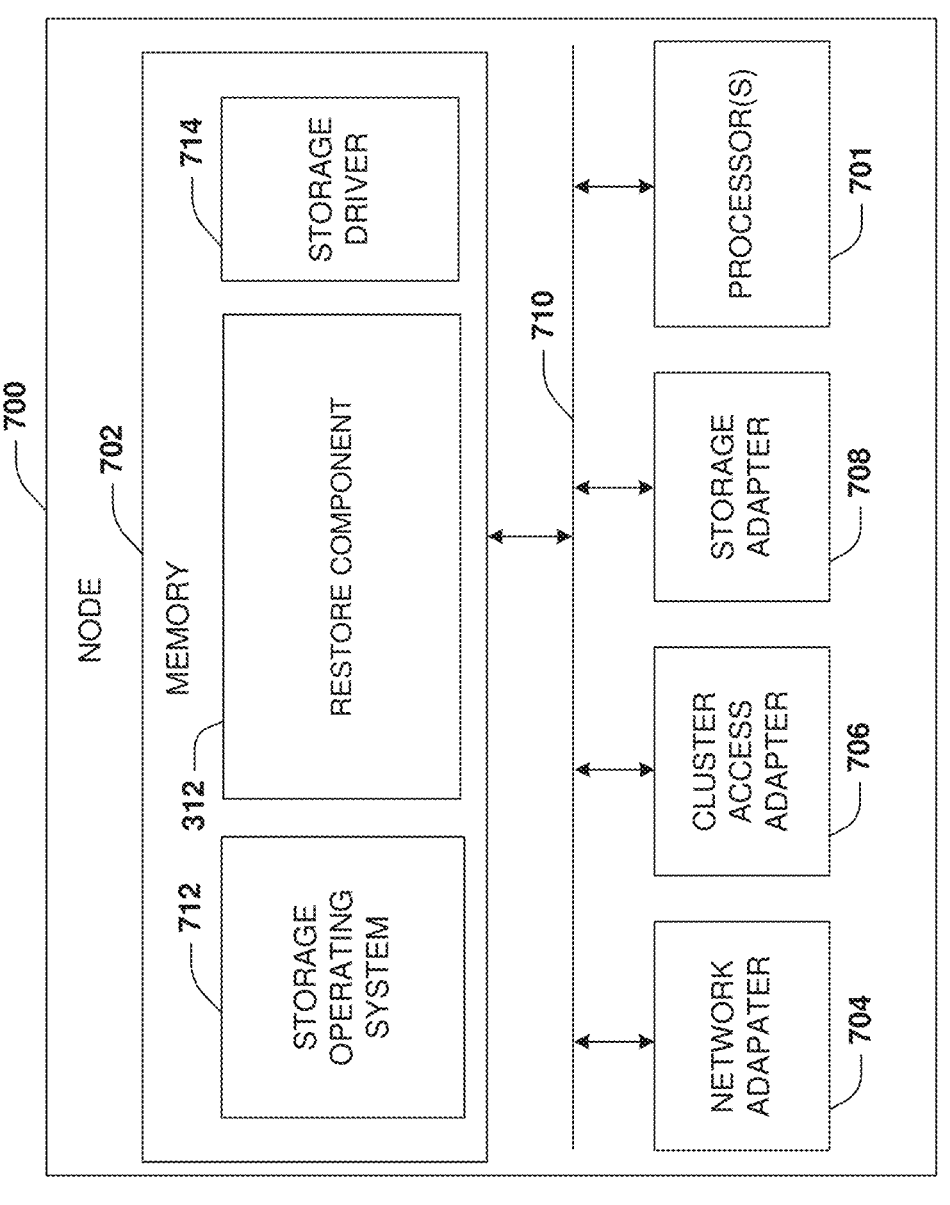
FIG. 7 is a block diagram illustrating an example of a node in accordance with an embodiment of the present technology.

Referring to FIG. 7, a node 700 (also referred to as a storage node) in this particular example includes processor(s) 701, a memory 702, a network adapter 704, a cluster access adapter 706, and a storage adapter 708 interconnected by a system bus 710. In other examples, the node 700 comprises a virtual machine, such as a virtual storage machine.

The node 700 also includes a storage operating system 712 installed in the memory 702 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc.

The network adapter 704 in this example includes the mechanical, electrical and signaling circuitry needed to connect the node 700 to one or more of the client devices over network connections, which may comprise, among other things, a point-to-point connection or a shared medium, such as a local area network. In some examples, the network adapter 704 further communicates (e.g., using Transmission Control Protocol/Internet Protocol (TCP/IP)) via a cluster fabric and/or another network (e.g., a WAN (Wide Area Network)) (not shown) with storage devices of a distributed storage system to process storage operations associated with data stored thereon.

The storage adapter 708 cooperates with the storage operating system 712 executing on the node 700 to access information requested by one of the client devices (e.g., to access data on a data storage device managed by a network storage controller). The information may be stored on any type of attached array of writeable media such as magnetic disk drives, flash memory, and/or any other similar media adapted to store information.

In exemplary data storage devices, information can be stored in data blocks on disks. The storage adapter 708 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 708 and, if necessary, processed by the processor(s) 701 (or the storage adapter 708 itself) prior to being forwarded over the system bus 710 to the network adapter 704 (and/or the cluster access adapter 706 if sending to another node computing device in the cluster) where the information is formatted into a data packet and returned to a requesting one of the client devices and/or sent to another node computing device attached via a cluster fabric. In some examples, a storage driver 714 in the memory 702 interfaces with the storage adapter to facilitate interactions with the data storage devices.

The storage operating system 712 can also manage communications for the node 700 among other devices that may be in a clustered network, such as attached to the cluster fabric. Thus, the node 700 can respond to client device requests to manage data on one of the data storage devices or storage devices of the distributed storage system in accordance with the client device requests.

A file system module of the storage operating system 712 can establish and manage one or more file systems including software code and data structures that implement a persistent hierarchical namespace of files and directories, for example. As an example, when a new data storage device (not shown) is added to a clustered network system, the file system module is informed where, in an existing directory tree, new files associated with the new data storage device are to be stored. This is often referred to as "mounting" a file system.

In the example node 700, memory 702 can include storage locations that are addressable by the processor(s) 701 and adapters 704, 706, and 708 for storing related software application code and data structures. The processor(s) 701 and adapters 704, 706, and 708 may, for example, include processing elements and/or logic circuitry configured to execute the software code and manipulate the data structures.

The storage operating system 712, portions of which are typically resident in the memory 702 and executed by the processor(s) 701, invokes storage operations in support of a file service implemented by the node 700. Other processing and memory mechanisms, including various computer readable media, may be used for storing and/or executing application instructions pertaining to the techniques described and illustrated herein.

In some embodiments, the restore component 312 is implemented by the node 700 in order to perform a directory restore operation targeting objects stored across multiple storage tiers of a cloud storage environment.

The examples of the technology described and illustrated herein may be embodied as one or more non-transitory computer or machine readable media, such as the memory 702, having machine or processor-executable instructions stored thereon for one or more aspects of the present technology, which when executed by processor(s), such as processor(s) 701, cause the processor(s) to carry out the steps necessary to implement the methods of this technology, as described and illustrated with the examples herein. In some examples, the executable instructions are configured to perform one or more steps of a method described and illustrated later.

Figure 8:
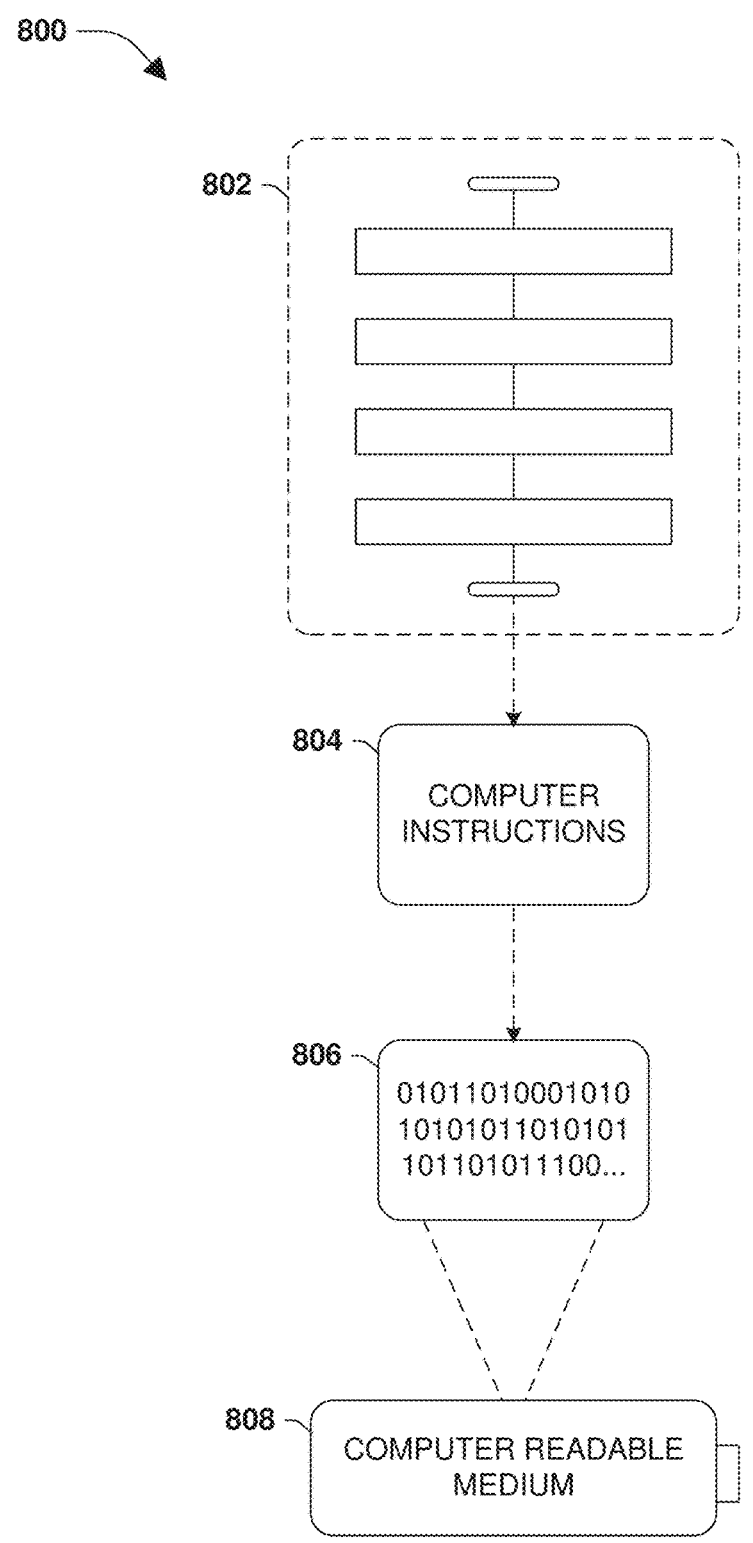
FIG. 8 is an example of a computer readable medium in which an embodiment of the present technology may be implemented.

Still another embodiment involves a computer-readable medium 800 comprising processor-executable instructions configured to implement one or more of the techniques presented herein. An example embodiment of a computer-readable medium or a computer-readable device that is devised in these ways is illustrated in FIG. 8, wherein the implementation comprises a computer-readable medium 808, such as a compact disc-recordable (CD-R), a digital versatile disc-recordable (DVD-R), flash drive, a platter of a hard disk drive, etc., on which is encoded computer-readable data 806. This computer-readable data 806, such as binary data comprising at least one of a zero or a one, in turn comprises processor-executable computer instructions 804 configured to operate according to one or more of the principles set forth herein. In some embodiments, the processor-executable computer instructions 804 are configured to perform a method 802. In some embodiments, the processor-executable computer instructions 804 are configured to implement a system. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:

traversing a directory and one or more sub-directories for a restore operation utilizing objects storing snapshot data of a volume comprising the directory, the objects stored within an object store of a cloud storage provider;

issuing one or more restore transfer commands to the cloud storage provider for restoring directory and sub-directory content items from a first storage tier of the object store;

determining that an object targeted by the restore operation is stored within a second storage tier of the object store;

issuing a command to the cloud storage provider to move the object from the second storage tier to the first storage tier as an unrestored object; and reissuing the restore operation to restore data from the unrestored object.

2. The method of claim 1, comprising:

issuing a first restore transfer command to directly access a first object within the first storage tier; and receiving an indication from the cloud storage provider for a second restore transfer command targeting a second object that the second object is not stored within the first storage tier based upon the second object being stored in the second storage tier inaccessible to the restore operation.

3. The method of claim 1, wherein the first storage tier is a standard cloud storage tier and the second storage tier is an archival cloud storage tier, and wherein the method comprises:

issuing a first restore transfer command to directly access a first object within the standard cloud storage tier; and receiving an indication from the cloud storage provider for a second restore transfer command targeting a second object that the second object is not stored within the standard cloud storage tier based upon the second object being stored in the archival cloud storage tier inaccessible to the restore operation.

4. The method of claim 1, comprising:

constructing the restore transfer commands to comprise a single file restore command for each content item encountered while traversing the directory.

5. The method of claim 1, wherein the reissuing the restore operation comprises:

constructing a reissued restore operation to skip restored objects already restored by the restore operation.

6. The method of claim 1, comprising:

determining an amount of time for the cloud storage provider to complete the command; and in response to waiting the amount of time, reissuing the restore operation.

7. The method of claim 1, comprising generating an object identifier map with object identifiers of unrestored objects targeted by the restore operation while traversing the directory, wherein the object identifier map is populated with object identifiers that constitutes all data for files in the second storage tier that are not yet restored by the restore operation.

8. The method of claim 1, wherein the restore operation is implemented at an object granularity and the restore operation supports restoring the directory using objects that are stored across multiple different storage tiers.

9. The method of claim 1, comprising:

in response to the cloud storage provider indicating that the object is not stored in the first storage tier, collecting pointers that represent the directory being restored;

identifying a set of objects comprising data pointed to by the pointers; and creating an object identifier map based upon the set of objects pointed to by the pointers.

10. The method of claim 9, comprising:

creating the pointers to represent unrestored content items of the directory.

11. The method of claim 1, comprising:

generating an object identifier map with object identifiers of unrestored objects targeted by the restore operation while traversing the directory.

12. A non-transitory machine readable medium comprising instructions for performing a method, which when executed by a machine, causes the machine to perform operations comprising:

obtaining identifiers of content items within a directory for a restore operation utilizing objects storing snapshot data of a volume comprising the directory, the objects stored within an object store of a cloud storage provider;

issuing restore operations for each content item using the identifiers;

in response to receiving a failure indication associated with an object targeted by a restore operation, continuing to traverse the directory until reaching an end of the directory, wherein object identifiers for unrestored objects are obtained during continued traversal of the directory; and issuing one or more commands, using the object identifiers, to the cloud storage provider to move the unrestored objects to a first storage tier from a second storage tier of the object store based upon the unrestored objects not being in the first storage tier.

13. The non-transitory machine readable medium of claim 12, wherein the operations comprise:

in response to issuing the one or more commands, failing the restore operation; and in response to the one or more commands completing, reissuing the restore operation to restore data from remaining unrestored object.

14. The non-transitory machine readable medium of claim 12, wherein the operations comprise:

obtaining the object identifiers for the unrestored objects storing data for unrestored content items identified by a set of identifiers obtained from a cloud directory iterator for the unrestored content items.

15. The non-transitory machine readable medium of claim 12, wherein a directory restore scanner traverses the directory as part of the restore operation, wherein the first storage tier is a standard storage tier and the second storage tier is an archival storage tier, and wherein the issuing the one or more commands comprises:

issuing the one or more commands for transferring the unrestored objects from the archival storage tier to the standard storage tier so that the directory restore scanner refrains from restoring the unrestored objects from the archival storage tier, and wherein the directory restore scanner operates on the unrestored objects transferred to the standard storage tier from the archival storage tier.

16. A computing device comprising:

a memory storing instructions; and a processor coupled to the memory, the processor configured to execute the instructions to perform operations comprising:

traversing a directory and one or more sub-directories for a restore operation utilizing objects storing snapshot data of a volume comprising the directory, the objects stored within an object store of a cloud storage provider;

issuing one or more restore transfer commands to the cloud storage provider for restoring directory and subdirectory content items from a first storage tier of the object store;

determining that an object targeted by the restore operation is stored within a second storage tier of the object store;

issuing a command to the cloud storage provider to move the object from the second storage tier to the first storage tier as an unrestored object; and reissuing the restore operation to restore data from the unrestored object.

17. The computing device of claim 16, wherein the operations comprise:

issuing a first restore transfer command to directly access a first object within the first storage tier; and receiving an indication from the cloud storage provider for a second restore transfer command targeting a second object that the second object is not stored within the first storage tier based upon the second object being stored in the second storage tier inaccessible to the restore operation.

18. The computing device of claim 16, wherein the operations comprise:

constructing the restore transfer commands to comprise a single file restore command for each content item encountered while traversing the directory.

19. The computing device of claim 16, wherein the operations comprise:

determining an amount of time for the cloud storage provider to complete the command; and in response to waiting the amount of time, reissuing the restore operation.

20. The computing device of claim 16, wherein the operations comprise:

generating an object identifier map with object identifiers of unrestored objects targeted by the restore operation while traversing the directory, wherein the object identifier map is populated with object identifiers that constitutes all data for files in the second storage tier that are not yet restored by the restore operation.

* * * * *